US010880959B2

(12) United States Patent
Nachtom et al.

(10) Patent No.: US 10,880,959 B2
(45) Date of Patent: Dec. 29, 2020

(54) AUTOMATIC PHASE CONTROL

(71) Applicant: GOJI LIMITED, Hamilton (BM)

(72) Inventors: Iddo Nachtom, Kiryat-Tivon (IL); Lior Darshan, Rishon-LeZion (IL)

(73) Assignee: GOJI LIMITED, Hamilton (BM)

( * ) Notice: Subject to any disclaimer, the term of this patent is extended or adjusted under 35 U.S.C. 154(b) by 439 days.

(21) Appl. No.: 15/561,325

(22) PCT Filed: Apr. 14, 2016

(86) PCT No.: PCT/IB2016/052127
§ 371 (c)(1),
(2) Date: Sep. 25, 2017

(87) PCT Pub. No.: WO2016/166695
PCT Pub. Date: Oct. 20, 2016

(65) Prior Publication Data

US 2018/0063901 A1 Mar. 1, 2018

Related U.S. Application Data

(60) Provisional application No. 62/148,214, filed on Apr. 16, 2015.

(51) Int. Cl.
*H05B 6/70* (2006.01)
*H05B 6/72* (2006.01)
(Continued)

(52) U.S. Cl.
CPC ........... *H05B 6/705* (2013.01); *H05B 6/6467* (2013.01); *H05B 6/664* (2013.01); *H05B 6/687* (2013.01); *H05B 6/688* (2013.01)

(58) Field of Classification Search
CPC ...... H05B 6/6467; H05B 6/687; H05B 6/664; H05B 6/705; H05B 6/688
(Continued)

(56) References Cited

U.S. PATENT DOCUMENTS

2010/0176121 A1 7/2010 Nobue
2013/0080098 A1* 3/2013 Hadad .................. H05B 6/6441 702/66

(Continued)

FOREIGN PATENT DOCUMENTS

EP 2051564 4/2009
JP 2009259616 11/2009

(Continued)

OTHER PUBLICATIONS

PCT Search report issued in PCT/IB2016/052127.
European Office Action dated Feb. 12, 2020 and issued in EP 16719913.2.

*Primary Examiner* — Quang T Van
(74) *Attorney, Agent, or Firm* — Greenblum & Bernstein, P.L.C.

(57) ABSTRACT

Disclosed are methods and apparatuses for heating an object in a cavity by feeding the cavity with RF signals. One of the disclosed methods includes simultaneously feeding the cavity with at least two RF signals. Of the at least two RF signals, a first RF signal is fed to the cavity via a first antenna and a second RF signal is fed to the cavity via a second antenna. The first and second RF signals have a common frequency and differ in phase by a first phase difference. The method also includes measuring the first phase difference and adjusting the feeding based on measurements of reflected RF signals reflected from the cavity. Conducting the measurements of the reflected RF signals may also be part of the disclosed method. A disclosed apparatus includes the structure required for carrying out the above method.

11 Claims, 8 Drawing Sheets

(51) Int. Cl.

| | |
|---|---|
| ***G01J 5/00*** | (2006.01) |
| ***H05B 6/64*** | (2006.01) |
| ***H05B 6/66*** | (2006.01) |
| ***H05B 6/68*** | (2006.01) |

(58) Field of Classification Search

USPC ....... 219/747, 704, 746, 702, 709, 438, 490, 219/690, 694, 695, 748, 679, 750; 324/637; 702/66; 250/338.1

See application file for complete search history.

(56) References Cited

U.S. PATENT DOCUMENTS

| | | | | |
|---|---|---|---|---|
| 2015/0156827 | A1 | 6/2015 | Ibragimov | |
| 2015/0245424 | A1* | 8/2015 | Brill | H05B 6/688 219/748 |
| 2016/0223402 | A1 | 8/2016 | Libman | |

FOREIGN PATENT DOCUMENTS

| | | |
|---|---|---|
| WO | 2014006510 | 1/2014 |
| WO | 2015027004 | 3/2015 |

* cited by examiner

AUTOMATIC PHASE CONTROL

FIELD OF THE INVENTION

The present disclosure is in the field of heating objects by RF signals of controlled frequency, phase, and/or amplitude.

BACKGROUND

Electromagnetic waves have been used in various applications to supply energy to objects. In the case of radio frequency (RF) radiation for example, electromagnetic energy may be supplied using a magnetron, which is typically tuned to a single frequency for supplying electromagnetic energy only in that frequency. One example of a commonly used device for supplying electromagnetic energy is a microwave oven. Typical microwave ovens supply electromagnetic energy at or about a single frequency of 2.45 GHz. In recent years, interest raised in heating objects, e.g., in RF ovens, using electromagnetic signals of various frequencies and at controlled phase differences between the signals.

SUMMARY OF A FEW ASPECTS OF THE DISCLOSURE

An aspect of some embodiments of the disclosed technology includes a method of heating an object in a cavity by feeding the cavity with RF signals. The method comprises:

simultaneously feeding the cavity with at least two RF signals comprising a first RF signal fed to the cavity via a first antenna and a second RF signal fed to the cavity via a second antenna, said first and second RF signals having a common frequency and differ in phase by a first phase difference;

measuring the first phase difference; and adjusting the feeding based on measurements of reflected RF signals reflected from the cavity so that the measured first phase difference approaches a target value.

The method may also include setting the target phase difference.

In some embodiments, heating the object may include cooking, drying, and/or thawing food.

In some embodiments, adjusting the feeding is based on measurements of a ratio between a first forward RF signal fed to the cavity via a first antenna and a signal reflected from the cavity via the first antenna when the first forward RF signal is fed into the cavity.

In some embodiments, the reflected signals are reflected from the cavity when an RF signal is fed into the cavity via one antenna at a time.

In some embodiments, measurements of the first phase difference are taken more often than measurements of the signals reflected from the cavity.

In some embodiments, the first phase difference is measured using a coupler having directivity worse than −30 dB.

In some embodiments, adjusting the feeding is based on:

measurements of reflected RF signals reflected from the cavity;

the value of the first phase difference; and error correction terms indicative of systematic errors in a measurement system used for measuring the first phase difference.

In some embodiments, the feeding is at power levels and for time durations sufficient to cook, thaw, or dry the food in the cavity.

In some embodiments, the method may also include heating the food by energy other than RF energy. In some such embodiments, the feeding is at power levels and for time durations sufficient to shorten the cooking, thawing, or drying of the food, in comparison to not applying the RF energy, by at least 15%.

In some embodiments, the setting is based on the food, for example, on RF absorption in the food.

In some embodiments, the first and second RF signals differ in amplitude by a first amplitude ratio, and the method comprises measuring the first amplitude ratio and adjusting the feeding so that the actual amplitude ratio between the first and second RF signals approaches an amplitude ratio target value.

An aspect of some embodiments of the presently disclosed technology includes a method of heating an object in a cavity by feeding the cavity with RF signals, where the method comprises:

feeding the cavity with at least one RF signal;

measuring an amplitude of one of the at least one RF signal; and adjusting the feeding based on measurements of reflected signals reflected from the cavity so that an actual amplitude of the signal entering the cavity approaches a target value.

In some embodiments, measurements of the amplitude are taken more often than measurements of the signals reflected from the cavity.

In some embodiments, the amplitude of the at least one RF signal is measured using a coupler having directivity worse than −30 dB.

An aspect of some embodiments of the presently disclosed technology comprises an apparatus for heating an object in a cavity by feeding the cavity with RF signals that differ in phase by a target phase difference. The apparatus may include a source of RF signals, a phase detector, and a processor.

The source of RF signals is configured to simultaneously supply RF signals of a common frequency to at least two output channels comprising a first output channel and a second output channel.

The phase detector is configured to:

- measure a first phase difference between an RF signal going through the first output channel towards the cavity and an RF signal going through the second output channel towards the cavity; and
- measure a reflection phase difference between an RF signal fed to the cavity via one of said at least two output channels and an RF signal returning from the cavity to the said one of said at least two output channels.

The processor is configured to control the source based on the measured reflection phase difference so that the first phase difference approaches the target phase difference.

In some embodiments, the phase detector is further configured to measure a phase difference between an RF signal fed to the cavity via the first antenna and an RF signal returning from the cavity to the first antenna.

In some embodiments, the apparatus further comprises:

- a power meter configured to measure an amplitude of an RF signal fed into the cavity through the first output channel. In some such embodiments, the processor is configured to control the source based on the measured reflection phase difference so that the amplitude measured by the power meter approaches a target amplitude value.

In some embodiments, the processor is configured to control the source based on:

measurements of reflected RF signals reflected from the cavity; the value of the first phase difference; and error correction terms indicative of systematic errors of a measurement system used to measure the first phase difference.

In some embodiments, said processor is configured to control the source based on the measured reflection phase difference so that the phase difference measured by the phase detector approaches the target phase difference value at power levels and for time durations sufficient to cook, thaw, or dry the food in the cavity.

In some embodiments, the apparatus includes a non-RF heater that in operation heats the food by energy other than RF energy, and wherein RF at the target phase difference is fed to the cavity at power levels and for time durations sufficient to shorten the cooking, thawing, or drying of the food by at least 15% in comparison to heating by the no-RF heater alone.

In some embodiments, the setting is based on the food, for example, the setting may be based on RF absorption in the food.

An aspect of some embodiments of the presently disclosed technology includes an apparatus for heating an object in a cavity by feeding the cavity with RF signals of controlled amplitudes, the apparatus comprising:

a source of RF signals, configured to supply RF signals to at least one output channel;

a power meter, configured to measure an amplitude of an RF signal fed into the cavity via the at least one output channel;

a phase detector configured to detect reflection phase differences between signals fed into the cavity through one of the at least one output channel and signals reflected from the cavity through the same one or another one of the at least one output channel;

and a processor configured to control the source based on at least one phase difference measured by the phase detector so that the amplitude measured by the power meter approaches a target amplitude value.

In some embodiments, the processor is configured to control the source based on S parameters of the cavity.

In some such embodiments, each of the S parameters has an amplitude and a phase.

In some embodiments, the apparatus may include, in each output channel, a coupler having a directivity worse than −30 dB.

An aspect of some embodiments of the disclosed technology includes a method of heating an object in a cavity by feeding the cavity with RF signals. The method may include:

measuring signal characteristics of reflected RF signals reflected from the cavity;

controlling a source to send trial RF signals to the cavity;

measuring signal characteristics of the trial RF signals on their way from the source to the cavity; and adjusting the control of the source based on the measurements of the signal characteristics of the reflected RF signals and the trial RF signals so that signal characteristics of the adjusted signals, sent to the cavity after said adjusting, approach target values.

In some embodiments, the measuring of the signal characteristics may be carried out when the object is inside the cavity. Additionally or alternatively, the RF signal may be sent to a cavity having in it the object to be heated. In some embodiments, the measuring and the controlling may make part of the heating.

In some embodiments, the method also includes setting the target values.

For example, setting the target values based on the measured signal characteristics of the reflected RF signals.

In some embodiments, the method is automatically executed a plurality of times, and each one of said plurality of times with new target values.

In some embodiments, the measurements of signal characteristics of reflected RF signals reflected from the cavity are taken before the source is controlled to send the trial RF signals to the cavity.

In some embodiments, the measurements of signal characteristics of reflected RF signals reflected from the cavity are taken before the target for the RF signal characteristic is set.

In some embodiments, setting the target values is based on the measured signal characteristics of the reflected RF signals.

In some embodiments, the RF signal characteristics include phases of the RF signals.

In some embodiments, the RF signal characteristics include amplitudes of RF signals.

In some embodiments, the RF signal characteristics include phase differences between RF signals characterized by the RF signal characteristics and reference RF signals generated by the source simultaneously with the RF signal characterized by the RF signal characteristic.

In some embodiments, the RF signal characteristics include amplitude ratios between RF signals characterized by the RF signal characteristics and reference RF signals generated by the source simultaneously with the RF signals characterized by the RF signal characteristics.

In some embodiments, the reference RF signals and the RF signal characterized by the RF signal characteristics have common frequencies.

In some embodiments, adjusting the control of the source is based on error correction terms saved on a non-volatile memory accessible to a processor that controls the source.

An aspect of some embodiments of the presently disclosed technology, includes a method of heating an object in a cavity by feeding the cavity with RF signals, the method comprising:

controlling a source to generate a trial RF signal for a trial period;

measuring at least one signal characteristic of the trial RF signal to obtain at least one measured value;

adjusting the control of the source, based on the at least one measured value and measurements of signal characteristics of reflected RF signals reflected from the cavity, to generate an adjusted RF signal; and feeding the cavity with the adjusted RF signal for a heating duration longer than the trial period.

In some embodiments, the method also includes setting a target for an RF signal characteristic, and adjusting the control of the source to bring the RF signal characteristic of the adjusted RF signal closer to the target than to RF signal characteristic of the trial RF signal.

In some embodiments, the method further comprising setting a new target for the RF signal characteristic, controlling the source to generate a new trial RF signal for a trial period;

measuring the new trial RF signal to obtain a new measured value;

adjusting the control of the source, based on the new measured value and measurements of reflected RF signals reflected from the cavity, to generate a new adjusted RF signal, so that the RF signal characteristic of the new adjusted RF signal is closer to that of the new target than to RF signal characteristic of the new trial RF signal; and feeding the cavity with the adjusted RF signal for a duration longer than the trial period.

In some embodiments, the measurements of reflected RF signals reflected from the cavity are taken before the source is controlled to generate the trial RF signal.

In some embodiments, the measurements of reflected RF signals reflected from the cavity are taken before the target for the RF signal characteristic is set.

In some embodiments, the target for the RF signal characteristic is set based on measurements of reflected RF signals reflected from the cavity.

In some embodiments, the RF signal characteristic is a phase of the RF signal.

In some embodiments, the RF signal characteristic is an amplitude of the RF signal.

In some embodiments, the RF signal characteristic is a phase difference between the RF signal characterized by the RF signal characteristic and a reference RF signal generated by the source simultaneously with the RF signal characterized by the RF signal characteristic.

In some embodiments, the RF signal characteristic is an amplitude ratio between the RF signal characterized by the RF signal characteristic and a reference RF signal generated by the source simultaneously with the RF signal characterized by the RF signal characteristic.

In some embodiments, the reference RF signal and the RF signal characterized by the RF signal characteristic have a common frequency.

In some embodiments, adjusting the control of the source is based on error correction terms saved on a non-volatile memory accessible to a processor that controls the source.

In some embodiments, the duration longer than the trial period is of predetermined length.

In some embodiments, the sum of the trial period and the duration longer than the trial period is of predetermined length.

In some embodiments, the method is automatically repeated, and the duration longer than the trial period is the same at all said repetitions.

In some embodiments, the method is automatically repeated, and a sum of the trial period and the duration longer than the trial period is the same at all said repetitions.

An aspect of some embodiments of the disclosed technology includes an apparatus for heating an object in a cavity, the heating being by feeding the cavity with RF signals generated by a source, the apparatus comprising:

a detector configured to detect a signal characteristic of an RF signal generated by the source as the RF signal travels from the source to the cavity; and a processor configured to:

control the source to generate a trial RF signal;

receive from the detector a measured value of the RF signal characteristic of the trial RF signal;

adjust the control of the source, based on the measured value and measurements of reflected RF signals reflected from the cavity, to generate an adjusted RF signal; and control the source to keep generating the adjusted RF signal for a heating duration longer than the trial period.

In some embodiments, the processor is configured to:

set a target for an RF signal characteristic, and adjust the control of the source to bring the RF signal characteristic of the adjusted RF signal closer to the target than to RF signal characteristic of the trial RF signal.

In some embodiments, the processor is configured to:

set a new target for the RF signal characteristic;

control the source to generate a trial RF signal for a trial period;

receive from the detector a measured value of the RF signal characteristic of the trial RF signal;

adjust the control of the source, based on the measured value and measurements of reflected RF signals reflected from the cavity, to generate an adjusted RF signal, so that the RF signal characteristic of the adjusted RF signal is closer to that of the new target than to RF signal characteristic of the trial RF signal; and control the source to keep generating the adjusted RF signal for a heating duration longer than the trial period.

In some embodiments, the processor is configured to set the target phase difference and/or the target amplitude, as the case may be.

The apparatus may be an RF oven. In some embodiments, the object is food, for example, food to be cooked, thawed, or dried.

In some embodiments, the processor is configured to control the source based on the measured reflection phase difference to feed the cavity with RF signals that differ in phase by a phase difference that approaches the target phase difference.

In some embodiments, the processor controls the source to generate dedicated RF signals for measuring reflected signals, reflected by the cavity in response to the dedicated RF signals, said control of the source to generate the dedicated RF signals being before the control of the source to generate the trial RF signal.

In some embodiments, the processor controls the source to generate dedicated RF signals for measuring reflected signals, reflected by the cavity in response to the dedicated RF signals, said control of the source to generate the dedicated RF signals being before the target for the RF signal characteristic is set.

In some embodiments, the processor is configured to set the target for the RF signal characteristic based on measurements of reflected RF signals reflected from the cavity.

In some embodiments, the RF signal characteristic is a phase of the RF signal.

In some embodiments, the RF signal characteristic is an amplitude of the RF signal.

In some embodiments, the RF signal characteristic is a phase difference between the RF signal characterized by the RF signal characteristic and a reference RF signal generated by the source simultaneously with the RF signal characterized by the RF signal characteristic.

In some embodiments, the RF signal characteristic is an amplitude ratio between the RF signal characterized by the RF signal characteristic and a reference RF signal generated by the source simultaneously with the RF signal characterized by the RF signal characteristic.

In some embodiments, the reference RF signal and the RF signal characterized by the RF signal characteristic have a common frequency.

In some embodiments, the apparatus may further include a non-volatile memory accessible to the processor, wherein the processor is configured to adjust the control of the source based on error correction terms saved on the non-volatile memory.

In some embodiments, the processor is configured to control the source based on measurements of reflected RF signals reflected from the cavity; the value of the first phase difference; and error correction terms indicative of systematic errors of a measurement system used to measure the first phase difference.

In some embodiments, the processor is configured to control the source based on the measured reflection phase difference so that the phase difference measured by the phase detector approaches the target phase difference value at power levels and for time durations sufficient to cook, thaw, or dry the food in the cavity.

In some embodiments, the apparatus may include a non-RF heater that in operation heats the food by energy other than RF energy. In some such embodiments, RF at the target phase difference is fed to the cavity at power levels and for time durations sufficient to shorten the cooking, thawing, or drying of the food by at least 15% in comparison to heating by the no-RF heater alone.

In some embodiments, the setting is based on the food, for example, the setting may be based on RF absorption in the food.

An aspect of some embodiments of the presently disclosed technology includes an apparatus for heating an object in a cavity, the heating being by feeding the cavity with RF signals, the apparatus comprising:

a detector configured to measure signal characteristics of at least one of: reflected RF signals reflected from the cavity and RF signals going towards the cavity; and a processor configured to:

control a source to send trial RF signals to the cavity;

receive from the detector signal characteristics of the trial RF signals; and adjust the control of the source based on the measurements of the signal characteristics of the reflected RF signals and the trial RF signals so that signal characteristics of the adjusted signals, sent to the cavity after said adjusting, approach target values.

In some embodiments, the processor is configured to set the target values.

In some embodiments, the processor is configured to set the target values based on the signal characteristics of the reflected RF signals.

In some embodiments, the processor is configured to execute a plurality of repetitions of said controlling, receiving, and adjusting, wherein each one of said plurality of repetitions is executed with new target values.

In some embodiments, the processor controls the source to generate dedicated RF signals for measuring reflected signals, reflected by the cavity in response to the dedicated RF signals, said control of the source to generate the dedicated RF signals being before the control of the source to generate the trial RF signal.

In some embodiments, the processor controls the source to generate dedicated RF signals for measuring reflected signals, reflected by the cavity in response to the dedicated RF signals, said control of the source to generate the dedicated RF signals being before the target for the RF signal characteristic is set.

In some embodiments, the RF signal characteristics include phases of the RF signals.

In some embodiments, the RF signal characteristics include amplitudes of RF signals.

In some embodiments, the RF signal characteristics include phase differences between RF signals characterized by the RF signal characteristics and reference RF signals generated by the source simultaneously with the RF signal characterized by the RF signal characteristic.

In some embodiments, the RF signal characteristics include amplitude ratios between RF signals characterized by the RF signal characteristics and reference RF signals generated by the source simultaneously with the RF signals characterized by the RF signal characteristics.

In some embodiments, the reference RF signals and the RF signal characterized by the RF signal characteristics have common frequencies.

In some embodiments, adjusting the control of the source is based on error correction terms saved on a non-volatile memory accessible to a processor that controls the source.

An aspect of some embodiments of the presently disclosed technology includes an apparatus for heating an object in a cavity by feeding the cavity with RF signals that differ in phase by a target phase difference, the apparatus comprising:

a source of RF signals, configured to generate RF signals of tunable amplitude and phase;

a phase detector, configured to:

measure a first phase difference between an RF signal going through the first output channel towards the cavity and an RF signal going through the second output channel towards the cavity; and measure a reflection phase difference between an RF signal fed to the cavity via one of said at least two output channels and an RF signal returning from the cavity to the said one of said at least two output channels; and a processor configured to compensate for changes in the reflections from the cavity so that RF signals arriving at the cavity remain substantially constant even when the reflections from the cavity change considerably.

An aspect of some embodiments of the presently disclosed technology includes an apparatus for heating an object in a cavity, the heating being by feeding the cavity with RF signals, the apparatus comprising:

a source, configured to generate RF signals of tunable frequency, amplitude and phase;

a detector configured to detect a signal characteristic of an RF signal generated by the source as the RF signal travels from the source to the cavity; and a processor configured to:

control the source to generate RF signals so that RF signals arriving at the cavity remain substantially constant even when reflections from the cavity change considerably.

The drawings and detailed description which follow contain numerous alternative examples consistent with embodiments of the invention. A summary of every feature disclosed is beyond the object of this summary section. For a more detailed description of exemplary aspects of the invention, reference should be made to the drawings, detailed description, and claims, which are incorporated into this summary by reference.

DETAILED DESCRIPTION

Overview

Figure 1:
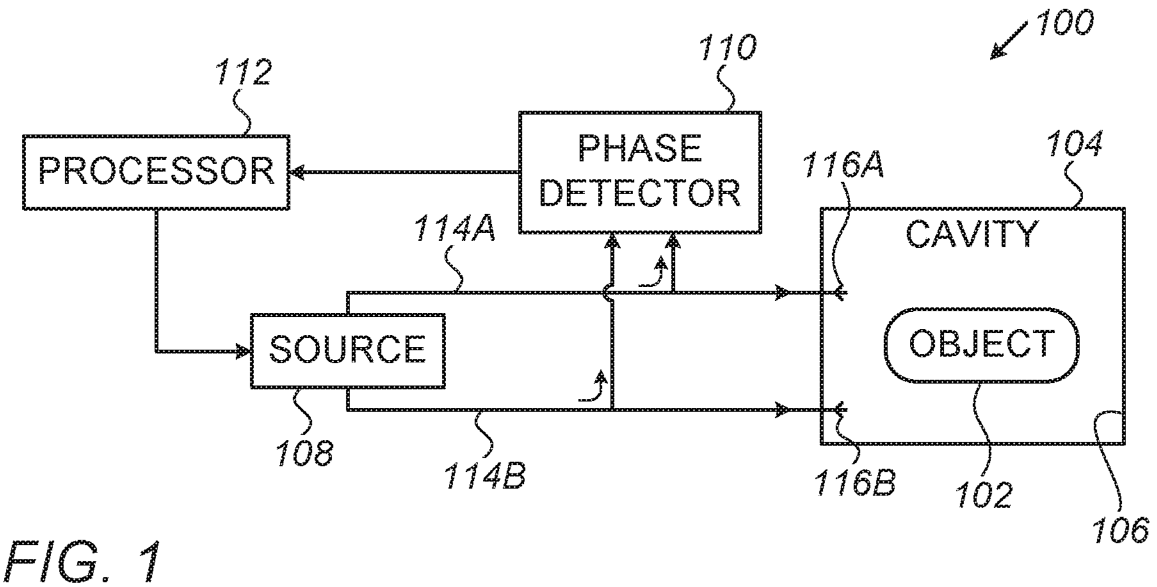
FIG. 1 is a diagrammatic presentation of an apparatus for heating an object in a cavity according to some embodiments.

One aspect of some embodiments of the invention includes a method of heating an object in an RF cavity by feeding RF signals into the cavity. The heating may be, for example, for cooking, thawing, or drying. For example, the feeding may be at power levels and for time durations sufficient to cook, thaw, or dry food in the cavity. In some embodiments, an addition, non-RF energy source may be used for heating the object, for example, hot air may be circulated in the cavity to cook the food by a combination of convection and RF heating. In some such embodiments, the RF heating contributes significantly to the heating. For example, a food may be cooked with a combination of non-RF heating and RF heating by at least 15% less time than by the non-RF heating alone. In some embodiments, the RF heating shortens the heating time by 20%, 30%, 40%, 50%, 60%, or intermediate percentage.

Portions of the signals fed to the cavity in order to heat the object may be reflected by the cavity. In some embodiments, the heating includes simultaneously feeding the cavity with at least two RF signals, each via a different antenna. The RF signals fed simultaneously have a common frequency, and differences between their phases are controlled. Additionally or alternatively, differences (or ratios) between amplitudes of the signals may be controlled. The inventors found that control of the phase difference generated by the RF source that generates the signals may be insufficient for controlling phase differences between signals fed into the cavity. One explanation to this finding may be that the phase difference changes along the output channel leading from the source to the antenna. However, the inventors found that even measuring the phase difference in the vicinity of the cavity, and control the source based on the measured phase differences may be insufficient to control the phase difference between the signals that enter the cavity. One explanation for this may be that the phase difference between the signals as they enter the cavity, referred to herein as actual phase difference, may differ from the measured phase difference. Reasons for differences between measured and actual phase differences may include, for example, influence of reflections from the cavity on the measured phase difference, and back reflections to the cavity from components that do not match perfectly to the incoming wave (e.g., from the amplifiers), which may also influence the measured phase difference. Similar reasons may also cause a measured amplitude of an RF signal to differ from the actual amplitude of the signal.

It was found by the inventors that when the source is controlled to supply signals of a target phase difference and reflections from the cavity exist, the phase difference obtained in the cavity may differ from the target value. For example, when the reflections change, the obtained phase differences also change, despite of the control of the source remaining constant. The phase difference between signals entering the cavity remains constant when reflections from the cavity change, only if the control of the source is adjusted to compensate for the changes in the reflections of the cavity, and, in some cases also for the back reflections from the amplifiers and/or sources. The reflections may change, for example, due to change in the dielectric constant of the object, as may happen, for example, when the object heats, thaws, or dries. Therefore, in some embodiments of the invention, the source is controlled based on measurements of signals reflected from the cavity. The reflections may be via the same antennas used for feeding the cavity with the heating RF signals. Measuring reflections may include measuring network parameters (e.g., s parameters) of the cavity with the heated object therein. The results of these measurements, or other measurements indicative of reflections from the cavity, may be used as input for an algorithm that adjusts the control of the source, so that target phase differences are obtained, or at least approached, despite of changes in the reflections from the cavity.

Thus, according to some embodiments of the present invention, both phase differences between signals going towards the cavity and reflections from the cavity are measured, and these measurements are used together for controlling the source so that the phase difference between signals entering the cavity approach the target phase differences.

In some embodiments, measurements of reflections may be replaced by measurements of scattering parameters (a/k/a S parameters) of the cavity. Measuring S parameters of a cavity is by itself well known in the field of heating by RF, and may involve measurements of reflections.

In some embodiments, the signals reflected from the cavity and/or S parameters of the cavity are measured once, and then the source is controlled for a relatively long period, during which the target phase differences may change. Still, the same measurements of reflected signals may be used for controlling the source to generate signals of the different target phase differences, as long as the dielectric response of the cavity (which may be defined by the S parameters of the cavity) and/or the dielectric response of the sources and/or amplifier do not change much. Thus, in some embodiments, measurements of phase differences between signals simultaneously fed into the cavity are taken more often than measurements of the signals reflected from the cavity. For example, the fed signals may be measured every time a target phase difference and/or a transmission frequency changes, e.g., each 1 millisecond, and the reflections may be measured once in 10 seconds, or any other time period, during which the dielectric response of the cavity with the object therein (and/or the amplifiers) is expected to be constant.

It is noted that methods similar to those discussed above may also be applied for controlling amplitudes of the signals fed into the cavity. For example, amplitudes of the signals going towards the cavity may be measured, and used together with measurements of signals reflected from the cavity to control the source (and/or amplifier(s)) so as to generate signals that arrive at the cavity at target amplitudes.

Alternatively or additionally, methods similar to those discussed above may be applied for controlling amplitude ratios between signals simultaneously fed into the cavity through different output channels. For example, amplitude ratios between signals going towards the cavity may be measured, and used together with measurements of signals reflected from the cavity to control the source (and/or amplifier(s)) so as to generate signals that arrive at the cavity at a target amplitude ratio.

Amplitudes may be controlled in addition to phase differences, in addition to amplitude ratios, or on their own. In some embodiments, even when a single antenna is used, it may be beneficial to use embodiments of the present invention for controlling the amplitude of the signals fed into the cavity, and control the amplitude of the generated signals and/or the amplification of these signals to approach a target amplitude or a target power level at the cavity entrance.

Another aspect of some embodiments of the invention includes an apparatus for heating an object in a cavity by feeding the cavity with RF signals that differ in phase by a target phase difference. The apparatus may include at least a source of RF signals, a phase detector, and a processor. The source may be configured to simultaneously supply RF signals of a common frequency to at least two output channels, each ending with its own antenna. The phase detector may be configured to measure phase differences between RF signals simultaneously transmitted through the two output channels. The processor may be configured to control the source so that the phase differences measured by the phase detector approach the target phase differences.

In some embodiments, the processor may be configured to set the target phase difference. For example, in some embodiments the processor may set the target phase difference based on pre-defined sequences of phase differences, frequency-phase combinations etc. The sequences may be pre-programmed to the processor, read from a memory accessible by the processor, or generated by the processor, for example, based on reflection measurements obtained during the heating.

In some embodiments the processor may select a pre-defined sequence from a plurality of pre-defined sequences based on input indicative of the kind of object that is being heated. For example, if the apparatus is used for cooking food, the processor may be programmed to select one sequence for cooking meat and another sequence for baking bread. In another example, the processor may receive information indicative of the efficiency at which RF energy is absorbed in the cavity at different phases or frequency-phase combinations, and generate a sequence based on such information, for example, by selecting frequency-phase combinations absorbed to some predetermined degree or range of degrees, and using only the selected combinations for heating.

As mentioned above, an apparatus according to some embodiments of the presently disclosed technology may include a phase detector. In some embodiments, the phase detector has two input ports and at least one output port. Each input port may receive input from one of the antennas. The input may be indicative of signals going forward towards the cavity via the antenna, or backwards from the cavity via the antenna. For example, for measuring a phase difference between two signals fed to the cavity simultaneously via two antennas, a portion of the signal going forward to one antenna may be directed to one of the phase detector input ports, and a portion of the signal going forward to another antenna may be directed to another input port of the phase detector. The output from the phase detector may be indicative of the phase difference between the two signals directed to the two input ports of the phase detector. In some embodiments, the apparatus may include a ratio detector, in addition to or instead of the phase detector. In some embodiments a single device may function as both phase detector and ratio detector. Such phase/ratio detector may have two input ports as described above, and two output ports, one for outputting the phase difference, and the other for outputting the amplitude ratio. In some embodiments, the apparatus may include a power meter, for measuring the amplitude (or power) of signals. The power meter may have an input port, to which a portion of the signal to be detected is directed, and an output port, through which the amplitude of the signal is outputted.

In some embodiments, the apparatus may include a multiplexer or other switching mechanism for switching portions of different signals to different ones of the inputs of the phase detector. In some embodiments, a processor may decide at each instant what parameter is to be measure, and control the switching mechanism accordingly. For example, for measuring S parameters the processor may control the switching mechanism to direct portions of forward signals to one input port of the phase detector and portions of backward signals to the other input port of the phase detector. In another example, for measuring phase differences between two signals fed to the cavity, the processor may control the switching mechanism to direct portions of one forward signal to one input port of the phase detector and portions of another forward signal to the other input port of the phase detector.

In some embodiments, the processor is configured to control the source so that the phase difference between two signals fed simultaneously into the cavity approaches the target phase difference. Such control may be based on measurements of the phase difference between RF signal fed to the cavity and RF signal returning from the cavity, for example, based on the phases of the cavity's S parameters.

In some embodiments, the phase detector may have a second output, for providing indication to the amplitude ratio between the two signals directed to the input ports of the phase detector. This output may be used, for example, for measuring the real part of the s parameters.

In some embodiments, the apparatus may include a power meter configured to measure power levels of signals inputted thereto. The power meter may output a signal indicative of the measured power. The signal indicative of the measured power may be a power signal. In some embodiments, the signal outputted by the power meter may be proportional to the log of the input signal power. Such power meter (e.g., log detector) may be useful for controlling the amplitude of the signals generated by the source and/or for controlling the power amplification of an amplifier amplifying a signal travelling from the source towards the antenna. For example, a target value may be set for the amplitude of a signal supplied to an antenna for feeding the cavity. Then, the processor may control the source to generate a signal, and receive from the power meter indication of the power the signal had at the end of the output channel. The processor may adjust the control of the source and/or amplifier to make the power of the detected signal closer to the target value. In adjusting the control, the processor may use an algorithm that receives as input, for example, the target power value, the measured power value, and the S parameters of the cavity.

In some embodiments, the apparatus may include a coupler, coupling a portion of signals from an end of an output channel to the log detector, e.g., via a switching mechanism as described above. The coupler may have directivity worse than −30 dB.

An aspect of some embodiments of the invention includes an apparatus for heating an object in a cavity, the heating being by feeding the cavity with RF signals through at least one antenna, and controlling the amplitudes of signals fed to the cavity to approach target values. The apparatus may include a source of RF signals, a power meter, a phase detector, and a processor. The source of RF signals may be configured to supply RF signals to at least one output channel. The power meter may be configured to measure the amplitude (or power) going through the output channel, and the phase detector may be configured to measure phase difference between signals going forward to the cavity and backwards from the cavity via the same antenna. The processor may be configured to control the source based on input from the power meter and the phase detector, so that the amplitude at the end of the output channel approaches the target amplitude value. The apparatus includes the phase detector, for allowing the controller to base the amplitude control on results of in situ reflection measurements.

In the present description and claims, the term RF signal refers to any electrical periodic phenomenon characterized by a frequency in the radio frequency range. The electrical phenomenon may be, for example, an electromagnetic wave, an oscillating electrical current, an oscillating electrical voltage, etc. The radio frequency range is between 100 MHz and 100 GHz, and includes microwave, high frequency (HF), and ultra-high frequency (UHF). In some embodiments, the RF signals may be limited to signals of frequency bands allowed by regulatory authorities for industrial, scientific, and medical use, also known as ISM bands. Examples of ISM bands include: between 433.05 and 434.79 MHz, between 902 and 928 MHz, between 2400 and 2500 MHz, and between 5725 and 5875 MHz. In addition to a frequency, an RF signal may be characterized by an amplitude and phase. The amplitude and phase may be referred to herein collectively as signal characteristics. In some embodiments, a phase of a signal of interest may be measured in relation to a phase of another signal, which may be referred to as a reference signal. The phase of the signal may then be referred to as a phase difference, between the phase of the signal of interest and the phase of the reference signal. In such embodiments, the phase of the reference signal may be defined as zero. The amplitude may be defined as half the difference between the highest and lowest point in a cycle of the electrical periodic phenomenon. For example, an oscillating voltage that oscillates between +50V and −50V has an amplitude of 50V. In addition to frequency and amplitude, an RF signal may be characterized by a phase. The phases of signals of common frequency govern how such signals add to each other. For example, two signals of common frequency and equal amplitude and phase add up to a signal of the common frequency and twice the amplitude of each of the two signals. Two signals of common frequency and equal amplitude, and phases that differ by 180° destroy each other and result in no signal at all (which may also be describes as a signal with zero amplitude).

Each of the above-discussed characteristics of an RF signal (i.e., frequency, amplitude, and phase) may be referred to herein as a signal defining parameter. Out of the signal defining parameters one or more may be controlled, and two or less may be uncontrolled, e.g., predefined in a manner that the apparatus cannot control it, or obtain values that change in an uncontrolled manner. The signal defining parameters that are controllable by the device may be referred to as controllable signal defining parameters, and the set of their values may be referred to as excitation setup. For example, if the apparatus controls only frequency, an excitation setup may be a frequency value (e.g., 2420 MHz). If the apparatus independently controls the frequency of two output channels, the excitation setup may be a set of two frequency values. If there are three output channels forced to output a common frequency, but in controllable phase differences, the excitation setup may include the value of the common frequency, a phase difference between the signal going through output channels 1 and 2, and the phase difference between signals going through output channels 1 and 3. Accordingly, as used herein, the term excitation setup may refer to a frequency, a phase difference, an amplitude ratio, or any combination thereof, for example, frequency-phase difference combinations, frequency-amplitude ratio combinations, phase difference amplitude ratio combinations, and combinations of frequency, phase difference and amplitude ratio. Thus, setting a target phase difference may be included in setting a target excitation setup.

The term phase difference is used to refer to a difference between two phases, in case only two signals are involved, or for a set of two differences between three phases if three signals are involved, and more generally to a set of n−1 phase differences, where n is the number of signals simultaneously transmitted by n antennas. For example, one of the n antennas may be a reference antenna, and the set of phase differences may include a phase difference between the signal fed through the reference antenna and each one of the signals fed through the other antennas. Similarly, the term amplitude ratio is used to refer to a ratio between two amplitudes, in case only two signals are involved, or for a set of two ratios between three amplitudes if three antennas are involved, and more generally to a set of n−1 amplitude ratios, where n is the number of signals simultaneously transmitted by n antennas. For example, one of the n antennas may be a reference antenna, and the set of amplitude ratios may include a phase difference between the signal fed through the reference antenna and each one of the signals fed through the other antennas. Similarly, the amplitude may be used to refer to an amplitude of one signal, in case only one signal is involved, or for a set of two or more amplitudes in the case two or more signals simultaneously transmitted through two or more antennas are involved.

Reference will now be made in detail to exemplary embodiments of the invention, examples of which are illustrated in the accompanying drawings. When appropriate, the same reference numbers are used throughout the drawings to refer to the same or like parts.

FIG. 1 is a diagrammatic presentation of an apparatus 100 for heating an object 102 in a cavity 104 including RF-reflective walls 106. Apparatus 100 may heat object 102 by feeding cavity 104 with RF signals that differ in phase by a target phase difference. Apparatus 100 may include source 108 of RF signals, phase detector 110, configured to measure phase differences between signals fed to cavity 104; and processor 112 configured to control source 108. Source 108 may be configured to simultaneously supply RF signals of a common frequency to output channels 114*a* and 114*b*. Each signal is output to a corresponding antenna 116A and 116B, by which it is fed to cavity 102.

Object 102, as well as any other object referred to here, e.g., as an object to be heated in a cavity, is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" encompasses such matter as food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply, even nominally, RF energy.

Cavity 104, as well as any other cavity referred to herein, wherein an object is to be heated by RF energy, may be included in an oven, chamber, tank, dryer, thawer, dehydrator, reactor, engine, chemical or biological processing apparatus, furnace, incinerator, material shaping or forming apparatus, conveyor, combustion zone, cooler, freezer, etc. In some embodiments, the cavity may be part of a vending machine, in which objects are processed once purchased. A cavity may include or be an electromagnetic resonator (also known as cavity resonator). The cavity may support resonance frequencies above a cutoff frequency, and source 108 may generate signals of frequencies above that cutoff frequency, so that some signals generated by source 108 may resonate in cavity 104. In some embodiments, however, signals generated by source 108 resonate in the object, and do not resonate in the cavity in absence of the object. A cavity (e.g., cavity 104) may have any suitable shape, such as cylindrical, semi-cylindrical, rectangular, elliptical, cuboid, symmetrical, asymmetrical, irregular, regular, among others. The cavity may be defined by one or more walls (e.g., wall 106) made of a conductor, such as aluminum, stainless steel or any suitable metal or other electrically conductive material. In some embodiments, the wall may be coated and/or covered with a protective coating, for example, made from materials transparent to EM energy, e.g., metallic oxides or others. In some embodiments, at least a portion of a wall defining the cavity is RF-reflective. In some embodiments, the cavity tends to reflect signals fed into the cavity for the purpose of heating the object in the cavity. While such reflections may be sometimes minimized (e.g., by selecting frequencies that are only slightly reflected, and heating the object using only the selected frequencies), at least some of the frequencies that the source is configured to generate are significantly reflected by the cavity. For example, in some embodiments, more than 1% of the power of a signal used for heating the object is reflected from the cavity back towards the source. This reflection may play a role in distorting measurement results of signal characteristics, as will be explained in detail below. The general methodology of the invention is not limited to any particular cavity shape or configuration.

Figure 2A:
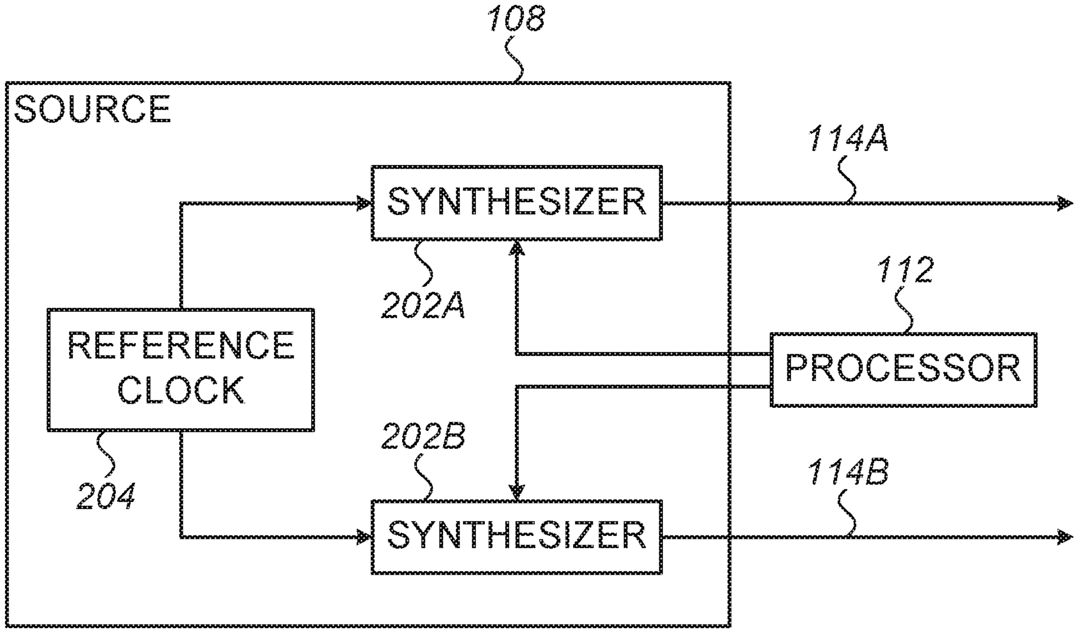
FIG. 2A is a simplified diagrammatic presentation of source connected to a processor and to two output channels according to some embodiments.

Source 108 may allow controlling the frequency, the phase, and/or the amplitude of each RF signal it generates, so it may be said to have tunable frequency, phase, and/or amplitude. FIG. 2A is a simplified diagrammatic presentation of source 108 according to some embodiments of the invention connected to a processor and to two output channels. In FIG. 2A synthesizers 202A and 202B are used as the signal generators. In some embodiments, the synthesizers may be direct digital synthesizers (DDSs). In some embodiments, the synthesizers may be analog synthesizers. In some embodiments, both analog and digital synthesizers may be used.

The synthesizers are all synchronized with each other using a common reference clock 204. Each synthesizer is controlled by processor 112 to provide signals of given frequency, amplitude and phase. Sources configured to supply more than two signals simultaneously may have more synthesizers. The phases of signals generated by one of the synthesizers may be independent of input from processor 112, as long as processor 112 may control the phase difference between each two of the signals. The signals outputted from the source go into output channels 114A and 114B, through which they get to antennas 116A and 116B, as described in more detail with reference to FIG. 4.

Although FIG. 2A shows a source supplying signals to two output channels, similar sources may be used for supplying signals to any number of output channels, for example, 3, 4, 6, 18, or any intermediate or larger number.

In some embodiments, an analog synthesizer may include an oscillator (e.g., a voltage controlled oscillator, a/k/a VCO), a phase lock loop (a/k/a PLL), and an IQ modulator. The VCO and PLL may jointly control the frequency of the synthesized signal, and the IQ modulator may control the phase and amplitude of the synthesized signal. Processor 112 may control in such embodiments the VCO to set the frequency, and the IQ modulator, to set the amplitude and the phase. The IQ modulators may be synchronized with each other through reference clock 204.

Figure 2B:
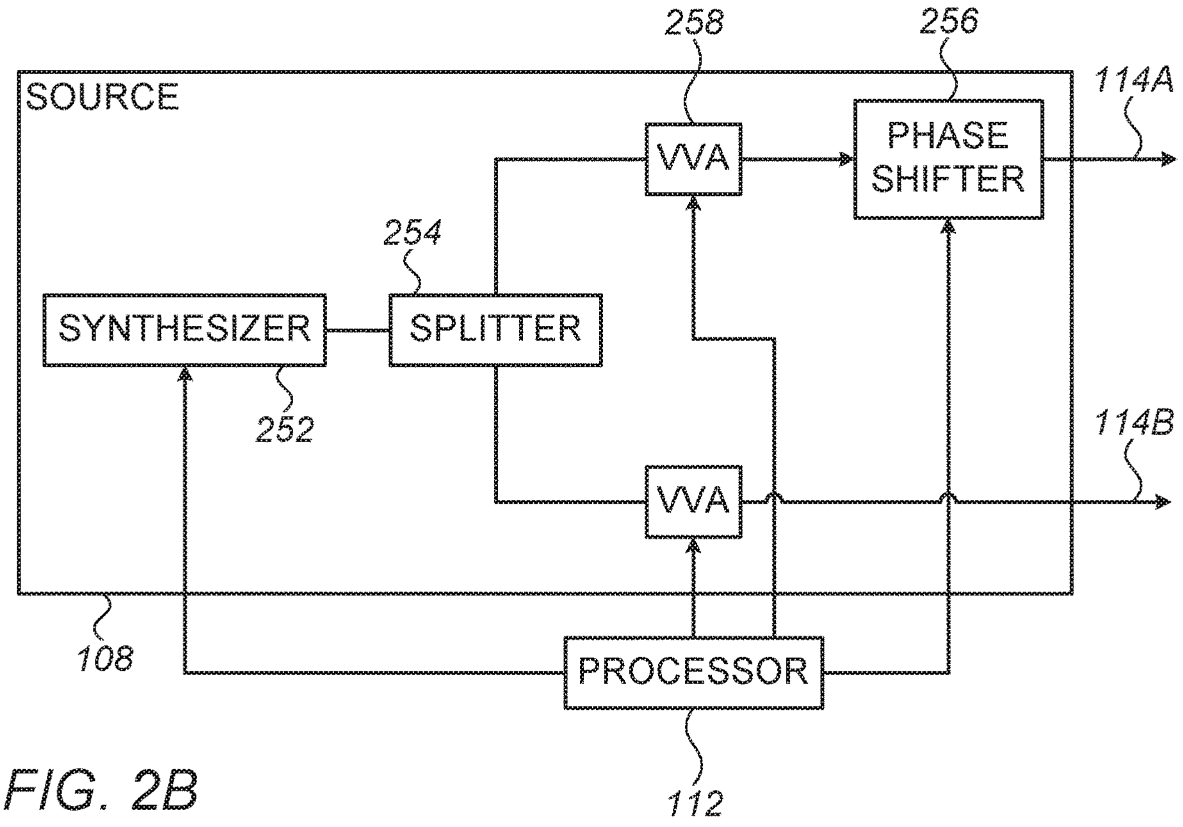
FIG. 2B is a simplified diagrammatic presentation of source connected to a processor according to some embodiments.

FIG. 2B is a simplified diagrammatic presentation of source 108 according to some embodiments of the invention connected to a processor. In FIG. 2B an analog signal synthesizer 252 is used as the signal generator. Synthesizer 252 may include a voltage controlled oscillator (VCO) with a phase lock loop (PLL). The VCO and the PLL are not shown in the figure. They may be connected to each other in ways well known in the art for synthesizing RF signals of controlled frequency. Processor 112 may send synthesizer 252 voltage signals of differing voltages, and control this way the frequency of signals generated by the VCO. Synthesizer 252 may be connected to splitter 254, which splits signals arriving to it from the synthesizer to two portions substantially equal in amplitude, and of identical phase. In some embodiments, splitter 254 may be an active splitter (e.g., a clock buffer), which may be advantageous over passive splitter in that it may have smaller loss. In the drawing, the splitter has one input and two outputs, but in some embodiments splitters of a different number of outputs may be used, to split the signal synthesized by the synthesizer to a larger number of splits. Each of the splits of the signal may go through a variable phase shifter 256, which may also be controlled by processor 112. In some embodiments, one split is not phase-shifted and its phase serves as a reference for all the other phases. Processor 112 may control the phase difference between every two splits of signals generated by source 108. In some embodiments, source 108 may also include attenuators (e.g., voltage variable attenuators, a/k/a VVAs) 258 to control the amplitude of each split signal. In some embodiments, each split goes through a VVA. Attenuators 258 may be used to control the amplitudes of the signals entering output channels 114A and 114B. This way, the amplifier 410 (see FIG. 4) may be of a fixed gain, and still, the signal output from the amplifier may be of variable amplitude. Attenuator 258 may be implemented before phase shifter 256 (as shown in the figure) or after it. This way source 108 generates signals of controlled frequency, amplitudes, and phase difference. These signals may then be directed to the output channels 114A and 114B, through which they get to antennas 116A and 116B.

Figure 3:
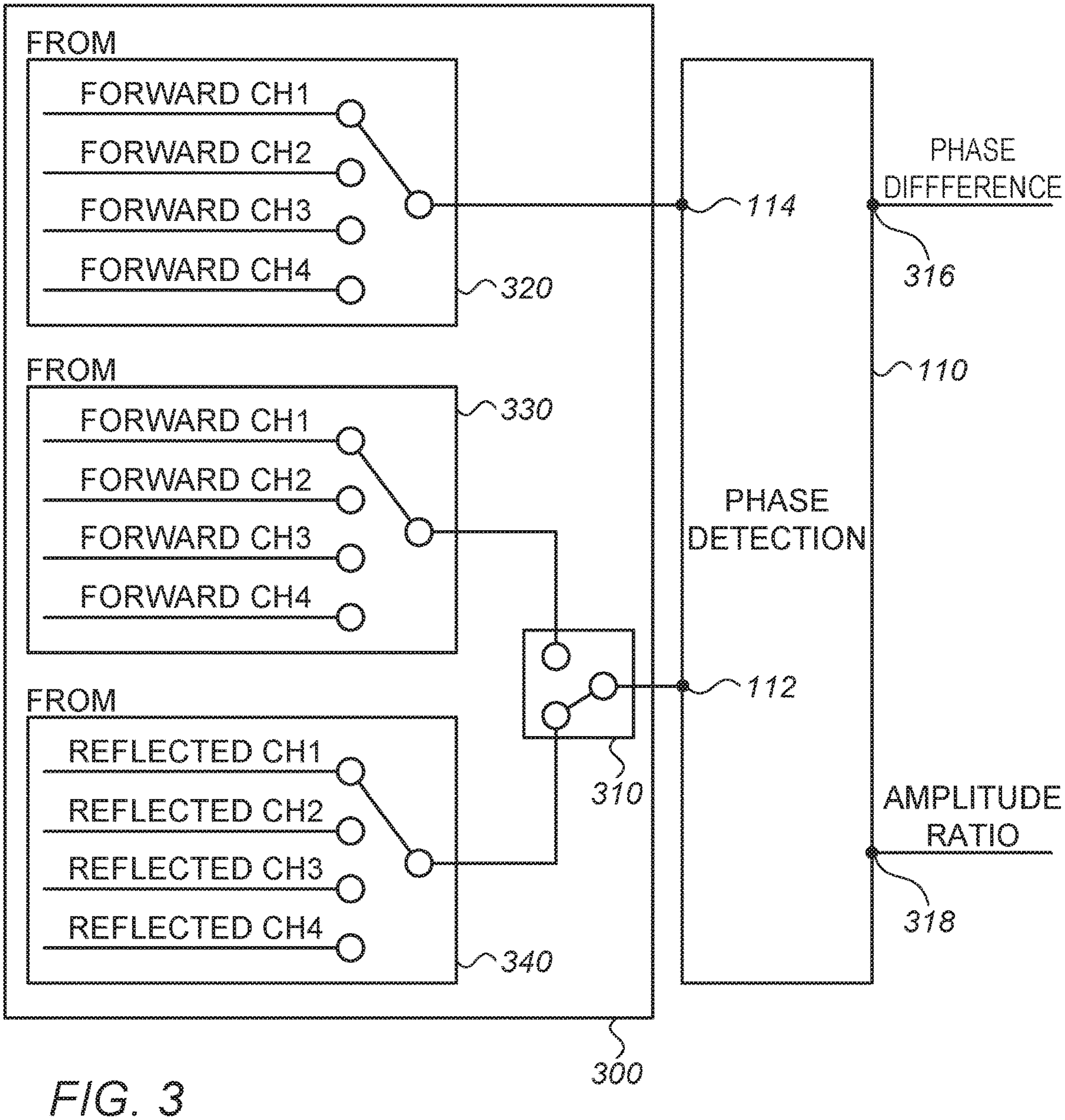
FIG. 3 is a diagrammatic illustration of a switching mechanism according to some embodiments.

As mentioned above, apparatus 100 may also include a phase detector 110. Phase detector 110 may be any device comprising a circuit that generates a signal (e.g., voltage signal) which represents a difference in phase between two signal inputs. Phase detector 110 may be, for example, a quadrature phase detector, e.g., a double balanced diode mixer (diode ring) or a four-quadrant multiplier (Gilbert cell). Phase detector 110 may have two input ports: 112 and 114 (FIG. 3). Phase detector 110 may have at least one output port 316. Signals outputted from output port 316 may include a signal indicative of a phase difference between the signals inputted to input ports 112 and 114. Phase detector 110 may also have another output port 318, the output going through which may include a signal indicative of an amplitude ratio between the signals inputted to input ports 112 and 114.

In some embodiments, phase detector 110 may be embodied by a plurality of phase detectors. For example, some of the phases that are to be measured by phase detector 110 may enter one phase detector, and other signals may enter a second phase detector, so long as the two phase detectors are synchronized, e.g, if the reference signal entering both are two splits of the same signal.

In some embodiments, apparatus 100 may also include a switching mechanism (not shown in FIG. 1), configured to deliver signals to the input ports of the phase detector. The switching mechanism (also referred to herein as a switchboard) may include one or more switching devices, for example, as illustrated in FIG. 3, which is a diagrammatic illustration of a switching mechanism 300 according to some embodiments. Switching mechanism 300 is for an apparatus 100 including four output channels, but similar switches may be used with other numbers of output channels as well. Switchboard 300 allows measuring phase differences between two forward signals or between a forward signal and a reflected signal, but not between two reflected signals, as this is not required for embodiments of the present disclosure. A phase difference between two forward signals may be measured to determine if a target phase difference is obtained or at least approached. A phase difference between a forward signal and a reflected signal may be measured, for example, to determine a phase of an S parameter. Switching mechanism 300 includes four switching units (also referred to herein as switches), numbered 310, 320, 330, and 340. Switching unit 310 has two states: a "reflected" state, wherein reflected signals go into input port 112 of phase detector 110, and "forward" state, wherein forward signals go into input port 112 of phase detector 110. Switching unit 310 may be a 2:1 multiplexer. Input port 114 of phase detector 110 may receive only forward signals through input port 116. Which forward signal is inputted into input port 116 (e.g., a forward signal from output channel 1, from output channel 2, etc.) is determined by switching unit 320, which may be a 4:1 multiplexer. Similarly, switching unit 330 determines which forward signal is inputted into switching unit 310 and switching unit 340 determines which reflected signal is inputted into switching unit 310. Thus, each of switching units 320 and 330 may be referred to as "a forward terminal", and switching unit 340 may be referred to as "reflected terminal". Using switching mechanism 300, a single phase detector 110 may be used for detecting all the phase differences that may be required for the operation of apparatus 100. In some embodiments, each of switching units 310, 320, 330, and 340 may be controlled by processor 112. Processor 112 may so determine which phase difference is measured by phase detector 112 at each instance. This way, the processor may associate each phase difference measured by phase detector 112 with the appropriate two signals, between which the phase difference was measured.

As used herein, the term "processor" may include any electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software. If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact. A reference to a processor configured to perform any task may thus refer to one processor, or to two or more processors that together are configured to perform the task.

Processor 112 may be configured to control source 108 to generate signals of a certain phase difference. In addition, processor 112 may be configured to receive from phase detector 110 indication as to a phase difference measured, for example, between two forward signals, e.g., between a signal going forward towards antenna 116A and a signal going forward towards antenna 116B. Processor 112 may be further configured to calculate, based on the measured phase difference a "real" phase difference between the same two signals. The real phase difference may be different from the measured one because of systematic errors in the phase differences measured by phase detector 110. Some such systematic errors are discussed herein. Processor 112 may be further configured to compare the "real" phase difference to a target phase difference. If the two are similar enough (for example, if an absolute difference between them is below some threshold or if the ratio between them is within a certain range), the processor may continue controlling source 108 to generate signals of the same certain phase difference. However, if the two are not similar enough, processor 112 may control source 108 to generate signals of a different phase difference, and repeat the process until the "real" phase difference approaches the target phase difference.

In some embodiments, processor 112 may also be configured to control switching mechanism 300, so that phase detector 110 measures all the data that may be required by processor 112.

In some embodiments, processor 112 may be configured to set the target excitation setup, e.g., a target phase, a target amplitude, and/or targets for frequency and one or more signal characteristics. For example, in some embodiments the processor may set the target excitation setup based on pre-defined sequences of excitation setups, for example, a predefined sequence of phases, frequency-phase combinations etc. The sequences may be pre-programmed to the processor, read from a memory accessible by the processor, or generated by the processor, for example, based on reflection measurements obtained during the heating. In some embodiments, the reflection measurements may be taken from signals transmitted at heating power level (e.g., full power), so measurement may be taken without slowing down the heating. In some embodiments, the measurements may be taken at sub-heating power level, during a short hiatus in the heating, but these embodiments may require further manipulations of the amplifier, or of attenuators configured to attenuate signals, so that the signals entering the cavity are sufficiently low not to heat the load considerably.

In some embodiments, the target excitation setup (e.g., target phase difference, amplitude, or amplitude ratio) may be based on the object to be heated, e.g., based on the food to be cooked. For example, in some embodiments the processor may select a pre-defined sequence from a plurality of pre-defined sequences based on input indicative of the kind of object that is being heated. The input may be provided by a user via a user interface. For example, if the apparatus is used for cooking food, the processor may be configured to receive via a user interface indication to the kind of the food. The processor may further be programmed to select different sequences of excitation setups for different kinds of food, for example, one sequence for cooking meat and another sequence for baking bread. In another example of setting excitation setups based on the object to be heated, the processor may receive information indicative of the efficiency at which RF energy is absorbed in the cavity at different excitation setups (e.g., at different phases or frequency-phase combinations), and generate a sequence based on such information, for example, by selecting frequency-phase combinations absorbed to some predetermined degree or range of degrees, and using only the selected combinations for heating.

Going back to FIG. 1, a signal generated by source 108 reaches an antenna through an output channel 114 (e.g., 114A, 114B of FIG. 1). Generating a signal so that it reaches an antenna may be referred to herein as sending a signal to the antenna.

Figure 4:
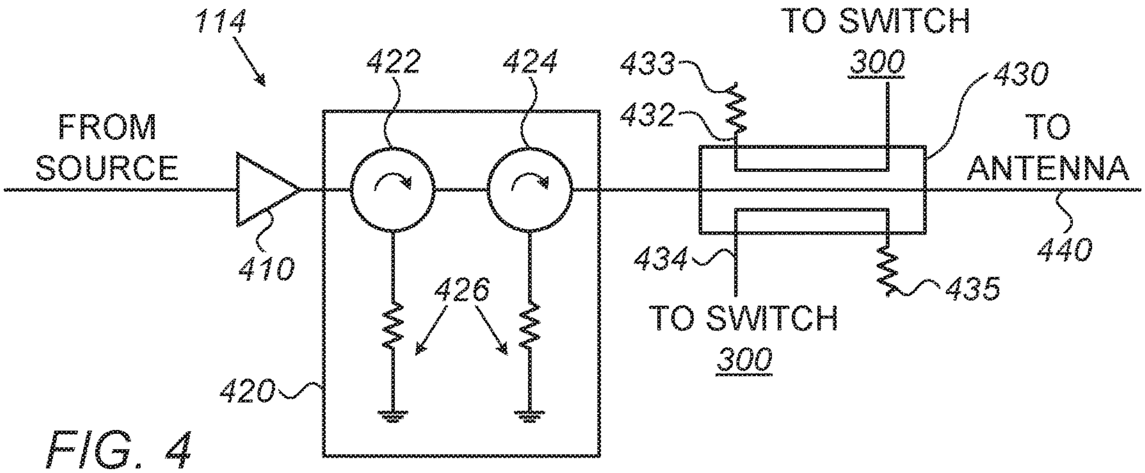
FIG. 4 is a diagrammatic representation of an output channel according to some embodiments.

FIG. 4 is a diagrammatic representation of an output channel 114 according to some embodiments. Output channel 114 may include amplifier 410, isolator 420, and coupler 430. The output channel may further include a waveguide 440 guiding signals from the coupler to the antenna. The waveguide may be a coaxial waveguide, and in some embodiments may be connected to the antenna by a connector (not shown). The waveguide and the connector may influence the phase and amplitude of the signals that enter the cavity, but their influence may be estimated in the factory and does not require on-line updates.

Amplifier 410 may amplify signals generated by source 108 to power levels effective in heating object 102, for example, to power levels of between 50 W and 1000 W. Output channel 114 may include two or more amplifiers, usually in series, which together amplify the signal to the required power level. The output power of the amplifier may be affected by the amplifier's temperature. For example, during heating of the object, the amplifier itself may heat and output lower power levels than were output in the beginning of the heating. In some embodiments, this may be compensated for by generating a signal of larger amplitude by the source (e.g., by decreasing the attenuation of VVA 258) and/or by increasing the amplification gain of the amplifier. Embodiments where the amplifier gain is controlled may include a control path for sending control signals from processor 112 to the amplifier. Amplitude corrections may be made automatically by processor 112. For example, when the amplitude of the signal going towards the cavity is determined to be lower than a target value, processor 112 may control source 108 to supply signals of larger amplitude.

Isolator 420 may be used to isolate amplifier 410 from influence of signals returning from cavity 104 through the output channel. Such isolation may be useful in lengthening the life of the amplifier, since strong returning signals may damage the amplifier. Isolator 420 illustrated in FIG. 4 comprises two three-port circulators 422 and 424, each directing signals from the amplifier forwardly, towards the antenna, while directing signals from the cavity away from the amplifier, to dummy loads 426, each comprising a grounded resistor.

In some embodiments, coupler 430 may be a dual directional coupler (as illustrated in FIG. 4). In some embodiments (not shown), coupler 430 may be a directional coupler. Coupler 430 couples a portion of the forward signal going through the coupler to phase detector 110, e.g., through a forward terminal (320 or 330) of switching mechanism 300. Coupler 430 may also couple a portion of the reflected signal going through the coupler to an input port of phase detector 110, e.g., through reflected terminal 340 of switching mechanism 300. For example, in the embodiment depicted in FIG. 4, coupler 430 comprises conductors 432 and 434, each of which may be a trace on a printed circuit board. Conductor 432 has two ends, one connected to switchboard 300, and from there to phase detector 110, depending on the state of the switchboard. The other end of conductor 432 may be connected to a 50 ohm load 433. Conductor 432 couples to the phase detector a small portion of the signals reflected from cavity 104 towards amplifier 410. Signal portions not coupled to the phase detector are directed to the dummy loads of isolator 420. Similarly, conductor 434 has two ends, one connected to switching mechanism 300 (and from there, to phase detector 110), and the other to a 50 ohm load 435. Conductor 434 couples to the switching mechanism small portions of signals going forward from amplifier 410 to cavity 104. Signal portions not coupled to the phase detector are directed to antenna 116, and from there to cavity 104. The signal portions directed to the phase detector may each be input into switching mechanism 300, and switched (or not) into phase detector 110 according to the states of each switching unit of switching mechanism 300.

In some embodiments, the main portions of the reflected signals (those that continue to isolator 420) may influence conductor 434, used for coupling forward signals to the phase detector. Such influences may cause a consistent error in the measurements obtained by phase detector 110. Thus, measuring the reflected signals may allow for correcting this error, although one should keep in mind that the reflected signal may also be influenced by the forward signal. The separation between the forward and reflected signals by the coupler may be quantified by a quantity known as directivity. The directivity of a coupler may be defined, as:

$$D = -10\log_{10}\left(\frac{P_{50\Omega}}{P_{Phase\ Detector}}\right)dB$$

wherein $P_{50\Omega}$ is the power of the signal going to the 50 ohm load ending one of the conductors 432 and 434 and $P_{Phase\ Detector}$ is the power of the signal coupled to the other end of the same conductor. Thus, each one of conductors 432 and 434 may be associated with its own directivity. In some embodiments, dual directional coupler 430 may be designed so that the directivity at both directions is the same, for example, −40 dB, −30 dB, −20 dB, or −10 dB.

Antenna 116 may include any radiating element matched to load 102 in cavity 104 at some or all of the frequencies generated by source 108. Antenna 116 may be any kind of antenna known in the art of RF heating or adapted to RF heating, for example, a dipole antenna, a monopole antenna, a loop antenna, an inverted F antenna, a leaky wave antenna, a close coupling antenna, etc.

Thus, apparatus 100 may be configured to heat object 102 in cavity 104 including an RF-reflective wall 106 by feeding the cavity with RF signals that differ in phase by a target phase difference. Being so configured may be achieved by including source 108, phase detector 110, and processor 112 interconnected as discussed herein. As mentioned above, source 108 may be configured to simultaneously supply RF signals of a common frequency to at least two output channels e.g., output channel 114A supplying signals to antenna 116A and output channel 114B supplying signals to antenna 116B. Phase detector 110 may be configured to measure a first phase difference between an RF signal supplied to antenna 116A and an RF signal supplied to antenna 116B, and generate a signal indicative of the measured phase difference. Processor 112 may be configured to control source 108 (for example, based on the signal received from the phase detector) so that the first phase difference approaches the target phase difference.

Figure 5:
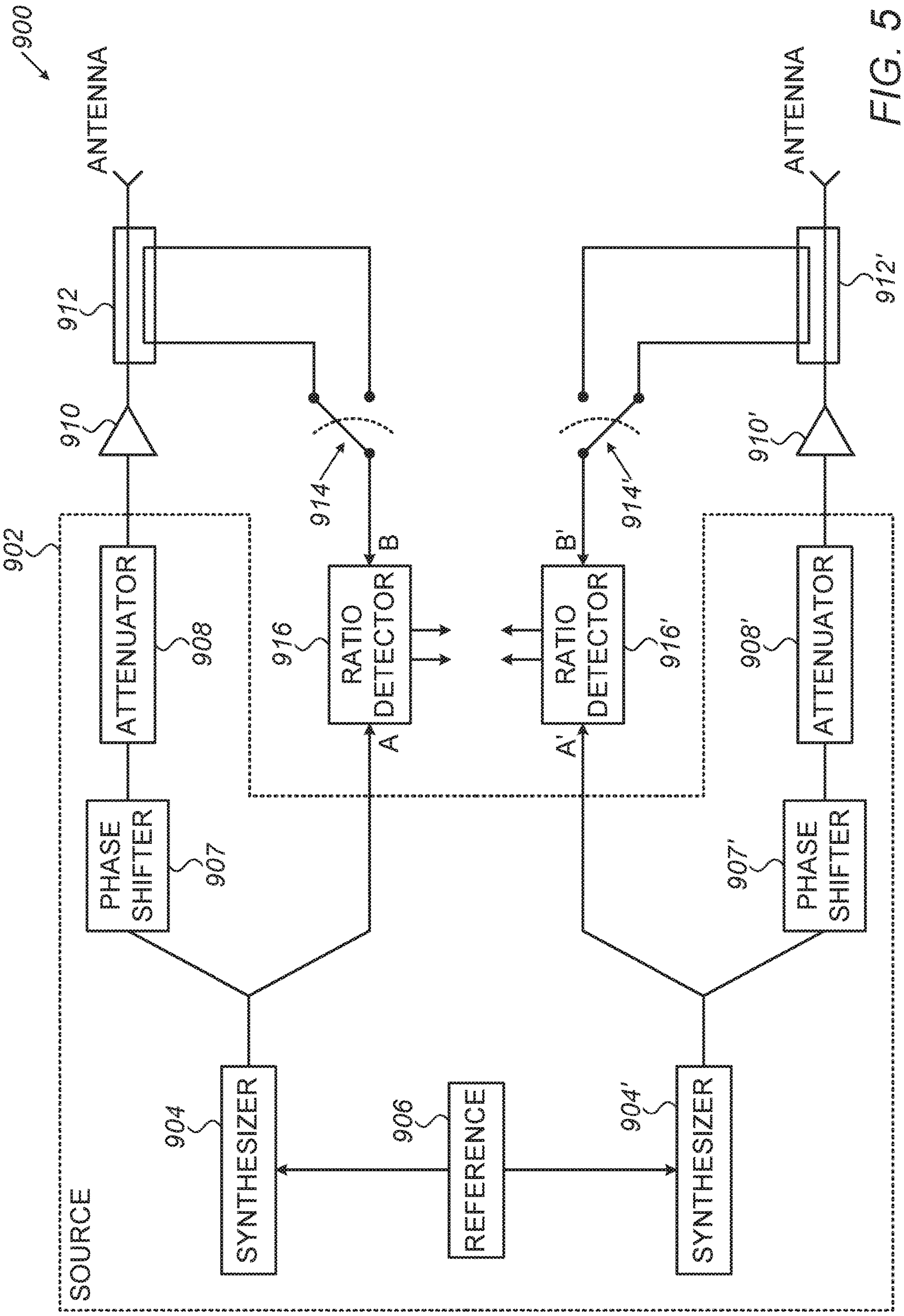
FIG. 5 is a diagrammatic illustration of an apparatus according to some embodiments.

FIG. 5 is a diagrammatic illustration of an apparatus 900 according to some embodiments of the invention. Apparatus 900 may be configured to heat an object in a cavity similarly to apparatus 100 of FIG. 1. A processor is not shown in FIG. 5 for simplicity, but may be included, for example, to control source 902 based on input received from ratio detectors 916 and 916'.

Apparatus 900 allows measuring each signal on its own output channel with its own phase detector (ratio detectors 916 and 916'), and obviates the need to bring all the signals into a single switching mechanism, such as the one depicted in FIG. 3.

Source 902 includes two synthesizers 904 and 904', which may be analogue synthesizers comprising, for example, a VCO and PLL interconnected as generally known in the art of synthesizing high frequency signals. Synthesizers 904 and 904' receive reference signals from a common reference source 906. The reference signals may be, for example, at a low frequency, e.g., 10 MHz, and are identical to each other both in frequency and phase. Each of synthesizers 904 and 904' outputs an RF signal at a frequency set to it by the processor, and at a phase determined by the phase of the reference signal. Differences between the signals outputted from the two synthesizers may be dealt with using, for example, the unknown thru calibration method (a/k/a the OSLR calibration method).

The signal going out of synthesizer 904 is split, and one split goes to ratio detector 916 (via input A). The other split may go through a phase shifter 907 and a variable gain attenuator 908 to amplifier 910. On its way to the antenna (and from there to the cavity, not shown in the figure), the signal goes through coupler 912. The two arms of coupler 912 are connected to ratio detector 916 through switch 914, the position of which determines if the ratio detector receives as input (to input port B) a signal going in the forward or backward direction. The ratio detector outputs an amplitude ratio and a phase difference, which may be received by the processor. These values reflect amplitude ratio and phase difference between the signal received from coupler 912 on the one hand, and signal received from synthesizer 904 on the other hand. Similarly, the values outputted from ratio detector 916' reflect amplitude ratio and phase difference between the signal received from coupler 912' on the one hand, and signal received from synthesizer 904' on the other hand. Amplitude ratio and phase difference between the signal received through couplers 912 and 912' are directly derivable from the output of the two ratio detectors (916 and 916') if the signal outputted from synthesizer 904 is the same as the signal outputted from synthesizer 904'. Differences between the signals may be considered by the processor using the unknown thru calibration method, treating these differences as characterizing an unknown reciprocal calibration standard connected between the outputs of the two synthesizers. As evident from FIG. 5, phase detectors 916 and 916' collaborate to measure a phase difference, which in FIG. 1, for example, is measured by a single phase detector (but using switching mechanism 300 instead of switches 914 and 914'). More generally, a reference to a detector configured to detect a signal characteristic (e.g., a phase detector configured to detect a phase difference) may refer to one detector, or to two or more detectors that together are configured to measure the signal characteristic.

In some embodiments, a power meter (e.g., a log detector) may be connected to measure the power of the signal coming out of switch 914. The power meter may be connected in parallel to ratio detector 916. Similarly, a power meter may be connected in parallel to ratio detector 916', to measure power of signals coming from switch 916'.

Apparatus 900 is drawn in FIG. 5 as including two synthesizers and output channels, but similar architecture may be used with any number of ports, e.g., 3, 4, 6, 8, 16, or intermediate or larger number. The method may become more advantageous as the number of output channels increases, because bringing all the signals to a single phase detector through a switching mechanism may become harder when a larger number of channels are involved, for example, because cross-talk between a larger number of channels in the switching matrix may increase as the number of channels increases.

Figure 6:
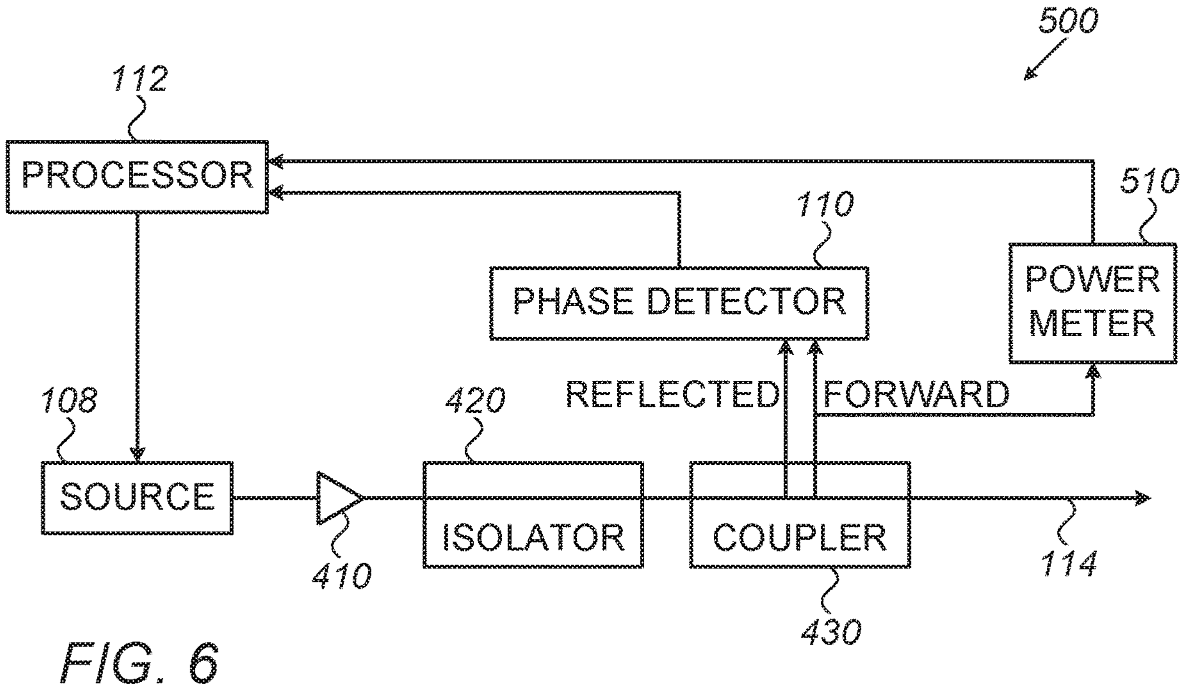
FIG. 6 is a diagrammatic presentation of an apparatus according to some embodiments.

FIG. 6 is a diagrammatic presentation of an apparatus 500 according to some embodiments of the invention. Apparatus 500 is configured to heat an object in a cavity, similarly to apparatus 100 of FIG. 1, 2A, or 2B. Apparatus 500 may heat the object by feeding the cavity with RF signals of a target power level. It is noted that the target power level is the power of signals supplied to the antenna, and not the power generated by source 108 or by power amplifier 410. It is further noted that the power amplification supplied in practice by amplifier 410 may depend upon the temperature of the amplifier and the reflections from the cavity. For example, in some embodiments, reflections from the cavity may be reflected back into the cavity (e.g., by the amplifier) and add to the forward power.

Apparatus 500 may include a source 108 of RF signals. In some embodiments, source 108 may be configured to simultaneously supply RF signals of a common frequency to a plurality of output channels 114. However, in the embodiment depicted in FIG. 6, source 108 feeds only one output channel. The source may include, for example, a single synthesizer. Phase shifter and splitters may be omitted.

Apparatus 500 may include a phase detector 110 having two input ports and configured to measure phase differences between two signals inputted through the input ports. Phase detector 110 may include an output port for outputting an output signal indicative of the measured phase difference, for example, the phase detector may generate a voltage output signal proportional to the measured phase difference. When a single output channel is used, as depicted in FIG. 6, one input port of the phase detector may receive a portion of the signal reflected from the cavity, and the other input port of the phase detector may receive a portion of the forward signal forwarded to the cavity. In some embodiments, for example when a plurality of signals are outputted simultaneously into the cavity through a plurality of output channels, a switching mechanism may be used to direct different signals to phase detector 110, as discussed above in relation to FIG. 1 and FIG. 3. In some embodiments, the portion of the forward signal is split with a splitter (not shown), so that one split continues towards the phase detector, and one split is directed to an input port of a power meter.

Apparatus 500 may further include power meter 510 and processor 112. Power meter 510 may be configured to measure the power of a signal forwarded to the antenna, and processor 112 may be configured to determine the actual amplitude of the signal entering the cavity, and control source 108 so that actual power estimated to be supplied to the antennas based on readings of power meter 510 and readings of the phase detector approaches the target power level. It was found by the inventors that the readings of power meter 510 may be influenced by reflections from the cavity. For example, it was found that readings of power meter 510 may change when the S parameter of the cavity changes while the control of the amplifier remains constant, therefore, processor 112 may be configured to control source 108 and/or amplifier 410 based on input from power meter 510 and phase detector 110. The phase detector may contribute the phase of the S parameter of the cavity to the calculation of power actually arriving at the antenna. In some embodiments, the phase detector may also have an output port outputting an output signal indicative of the ratio between two input signals. This output may be used in some embodiments to determine the magnitude of the S parameter. Alternatively, a portion of the reflected signal may also be coupled to the power meter, and the power levels of the reflected and forwarded signals (or the amplitude of the forward (or backward) signal and the ratio between them) may be used for determining the magnitude of the S parameter.

As indicated above, some embodiments of the invention may include controlling the source based on measurements of reflected signals and forward signals. The forward signals may include, for example, a first signal going to the cavity via a first output channel and a second signal going to the cavity via a second output channel. The measurements of the reflected signals may include measurement of a first reflected signal reflected from the cavity via the first output channel, and a second reflected signal reflected from the cavity via the second output channel. In some embodiments, the measurements of the reflected signals may include measurements of S parameters of the cavity. In some embodiments, the processor may control the source to generate signals especially for measuring the reflected signals. These dedicated RF signals may be emitted, for example, from one antenna at a time. In some embodiments, the dedicated RF signals may be emitted by two or more antennas simultaneously and at a common frequency, provided the number of dedicated RF signals that are linearly independent of each other is at least as large as the number of output channels in the apparatus.

In the following, a method is described for determining the actual signals going into the cavity from measurements of signals going forward to the cavity and S parameters of the cavity.

Figure 7:
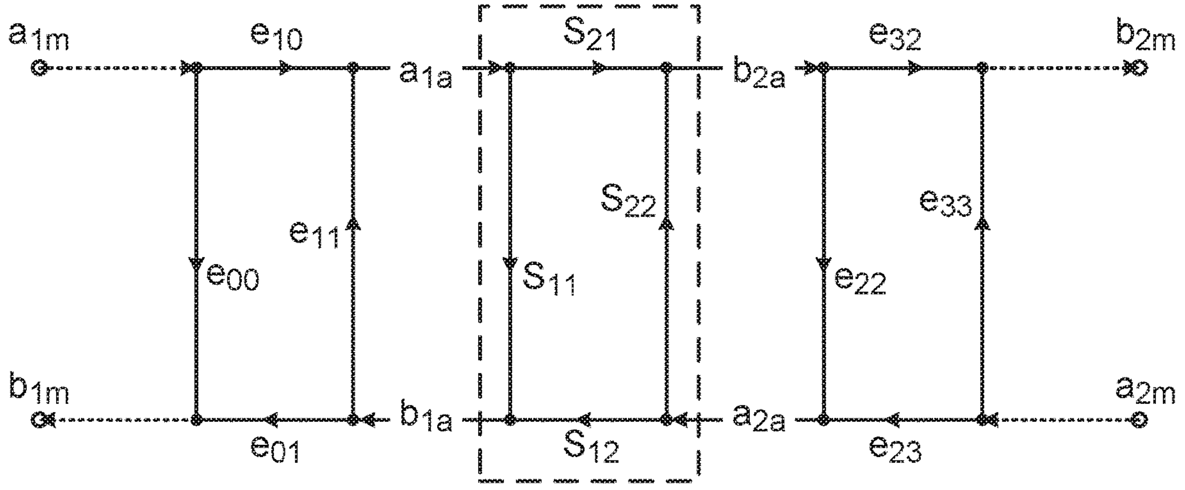
FIG. 7 is a diagrammatic presentation of a cavity that is fed with RF signals via two ports.

FIG. 7 is a diagrammatic presentation of a cavity (area surrounded by dashed line) that is fed with RF signals via two ports. One port is represented by the left hand side of the cavity, and one port is represented by the right hand side of the cavity. The arrow $a_{1a}$ stands for the actual signal going into the cavity via port 1, and the arrow $b_{1a}$ stands for the actual signal reflected from the cavity via port 1. Similarly, the arrow $a_{2a}$ stands for the actual signal going into the cavity via port 2, and the arrow $b_{2a}$ stands for the actual signal reflected from the cavity via port 2. The dashed arrow $a_{1m}$ stands for the signal measured to go forward to the cavity via port 1, and the dashed arrow $b_{1m}$ stands for the signal measured to be reflected from the cavity via port 1. Similarly, the dashed arrow $a_{2m}$ stands for the signal measured to go forward to the cavity via port 2, and the dashed arrow $b_{2m}$ stands for the signal measured to be reflected from the cavity via port 2. In short, the subscript $_a$ stands for actual, the subscript $_m$ stands for measured, the number stands for the port number, and the letters a and b stand for forward and reflected signals, respectively.

The systematic errors introduced into the readings of the measured values by the measurement system (e.g., due to the finite directivity of the couplers 430, port matching, etc.) are modeled here by 8 error correction terms: $e_{00}$; $e_{11}$; $e_{10}$; $e_{11}$; $e_{22}$; $e_{33}$; $e_{32}$; and $e_{33}$. These error correction terms can be measured by well-defined procedures known in the art of calibrating high accuracy RF measurement equipment, such as vector network analyzers. The error correction terms may be measured in the factory manufacturing an apparatus according to the present disclosure, and stored on a non-volatile memory accessible to the processor (e.g., to processor 112). The non-volatile memory may make part of the processor or may be external to the processor and in data communication therewith. The S parameters may be calculated based on the error correction terms, the measured forward signals and the measured backward signals. These calculations are also well known in the art.

To tell the actual signals based on measured values, the following four equations may be written:

$$\begin{cases} a_{1a} = a_{1m}e_{10} + b_{1a}e_{11} \\ b_{1a} = a_{1a}S_{11} + a_{2a}S_{12} \\ a_{2a} = a_{2m}e_{23} + b_{2a}e_{22} \\ b_{2a} = a_{2a}S_{22} + a_{1a}S_{21} \end{cases}$$

These equations were derived from FIG. 7. For example, the first equation states that the actual signal entering the cavity through port 1 ($a_{1a}$) is the sum of the following two terms:

(1) that portion of the signal measured to be sent to the cavity ($a_{1m}$) that indeed continued towards the cavity; and (2) that portion of the signal that was actually reflected from the cavity ($b_{1a}$) but reflected back into the cavity. The other equations were similarly derived from FIG. 7.

After rearranging, and writing using matrix formulation, these four equations may take the following form:

$$\begin{bmatrix} (1 - S_{11}e_{11}) & -S_{12}e_{11} \\ -S_{21}e_{22} & (1 - S_{22}e_{22}) \end{bmatrix}^{-1} \begin{bmatrix} a_{1m}e_{10} \\ a_{2m}e_{23} \end{bmatrix} = \begin{bmatrix} a_{1a} \\ a_{2a} \end{bmatrix}$$

As may be seen, this matrix equation shows how to obtain the actual forward signals $a_{1a}$ and $a_{2a}$ based only on measured values: S parameters, error correction terms, and measured forward signals. Since all the values in the matrixes above are complex, these matrixes allow calculating both magnitude and phase of each forward actual signal. This way, each time the source is controlled, the measurements of the forward signals may allow calculating the actual forward signals, and the source may be controlled so that the actual forward signals approach the target values.

In an alternative approach, the target actual forward signals are provided to the processor as input, and the processor may calculate once per signal which values are to be measured when the target actual signal is obtained. This way, there may be defined a target measured signal, and the source may be controlled so that the measured signals approach the target measured signals. This saves the need to solve the matrix equation at each step of the iterative process by which the actual values approach the target. It may be pointed that in both approaches the actual signals approach the target, but the control of the processor may be based on values calculated from the measured signals (in the first approach described above) or based directly on the measured signals (in the alternative approach). According to the alternative approach, the equations may be rearranged and written in matrix formulation as follows:

$$\begin{bmatrix} (1-S_{11}e_{11}) & -S_{12}e_{11} \\ -S_{21}e_{22} & (1-S_{22}e_{22}) \end{bmatrix} \begin{bmatrix} a_{1a} \\ a_{2a} \end{bmatrix} = \begin{bmatrix} a_{1m}e_{10} \\ a_{2m}e_{23} \end{bmatrix}$$

As may be seen, this matrix equation shows what forward signals are expected to be measured ($a_{1m}$ and $a_{2m}$) when given target actual signals $a_{1a}$ and $a_{2a}$ are obtained. The matrix uses only measured values: S parameters, error correction terms, and measured forward signals. Since all the values in the matrixes above are complex, these matrixes allow calculating both magnitude and phase of each forward actual signal, or, in the alternative approach, of each target measured signal.

It is noted that the 8 error correction terms model described above is one of many possible models by which the measurement system may be modeled, and other models may result in other equations that will give more or less accurate determinations of the actual and/or measurement target signals. It is also noted that using the 8 error correction terms model does not necessitate the use of S parameters. Instead, other measurable parameters may be used, for example, reflected signals (e.g., $b_{1m}$ and $b_{2m}$) and/or error terms not used in the above equations, e.g., $e_{00}$.

While the above description relates to a system with two output channels (ports), the same principles may also be used for any other number of ports. The equations for a 4-port system, where systematic errors are modeled in a 12 error terms model is provided below (in matrix form) as an example.

$$\left(\begin{bmatrix} (1-S_{11}E_{s1}) & -S_{12}E_{s1} & -S_{13}E_{s1} & -S_{14}E_{s1} \\ -S_{21}E_{s2} & (1-S_{22}E_{s2}) & -S_{23}E_{s2} & -S_{24}E_{s2} \\ -S_{31}E_{s3} & -S_{32}E_{s3} & (1-S_{33}E_{s3}) & -S_{34}E_{s3} \\ -S_{41}E_{s4} & -S_{42}E_{s4} & -S_{43}E_{s4} & (1-S_{44}E_{s4}) \end{bmatrix}\right)^{-1} \begin{bmatrix} a_{1m} \\ a_{2m} \\ a_{3m} \\ a_{4m} \end{bmatrix} = \begin{bmatrix} a_{1a} \\ a_{2a} \\ a_{3a} \\ a_{4a} \end{bmatrix}$$

Here, the error term $E_{s1}$ has a role similar to that of $e_{11}$ in FIG. 7, i.e. a term related to coupling between the actual forward and actual backward at port 1. More generally, the error term $E_{si}$ is related to $e_{11}$ obtained for port i.

Thus, in some embodiments, the error terms (or other parameters that may be used for modeling the systematic errors of the measurement system) are measured in advance, e.g., in the factory, and saved on memory accessible to processor 112.

According to some embodiments, in operation, the S parameters are measured as follows. The forward and backward signals are measured for each frequency, where at each measurement only one port emits radiation, i.e. signals are transmitted from the source through only one output channel at a time, and forward and backward signals are measured at all the ports. The S parameters are calculated based on these measurements and the already saved values of the error correction terms. The S parameters may then be saved on a memory accessible to processor 112. Then, when a target phase difference is to be obtained, the processor may calculate which signals are expected to be measured when the target phase difference is output through the output channels. These signals may be referred to as a target set for the measured signals. In some embodiments, the S parameters may be calculated based on measurements made when signals are outputted simultaneously from a plurality of antennas. Any other set of linearly independent transmissions may be used for calculating the S parameters.

At this stage, trial signals may be transmitted through the output channels. In some embodiments, the trial signals are not arbitrary, but selected to provide a phase difference similar to the target phase difference, e.g., based on past experience. The obtained phase difference is measured, and compared to the target set for the measured phase difference. If the measured phase difference is sufficiently close to the target set for the measured phase difference, the trial signals may be kept in use, e.g., until the processor determines that a different target is to be achieved. If the actual phase difference is too different from the target phase difference (e.g., a difference between the measured value and the target set for the measured value is above a predetermined threshold, or the ratio between them is outside a given range, etc.), the trial signals are adjusted so as to make the measured phase difference sufficiently close to the target set for the measured phase difference. Such adjustments may be repeated as many times as required. The process of trying control signals, evaluating actual phase differences, and adjusting the control signals may be repeated each time the target phase difference changes. However, repetition of the measurement of the S parameters may be repeated less frequently, for example, at time intervals long enough to allow the dielectric response of the cavity to change, e.g., due to a change in the object heated in the cavity. The change may include, for example, thawing, heating, drying, cooking, etc.

While the latter example was given in respect of a single target phase difference between signals transmitted via two output channels, the same process, with the necessary changes being made, may be used for obtaining a target amplitude and/or a target amplitude-phase combination. If more than two output channels exist, a similar process may be used for approaching a plurality of target phase differences, amplitudes, and/or amplitude-phase combinations. Similar procedure also allows for controlling a source to output a single signal of a target amplitude via a single output channel.

Figure 8A:
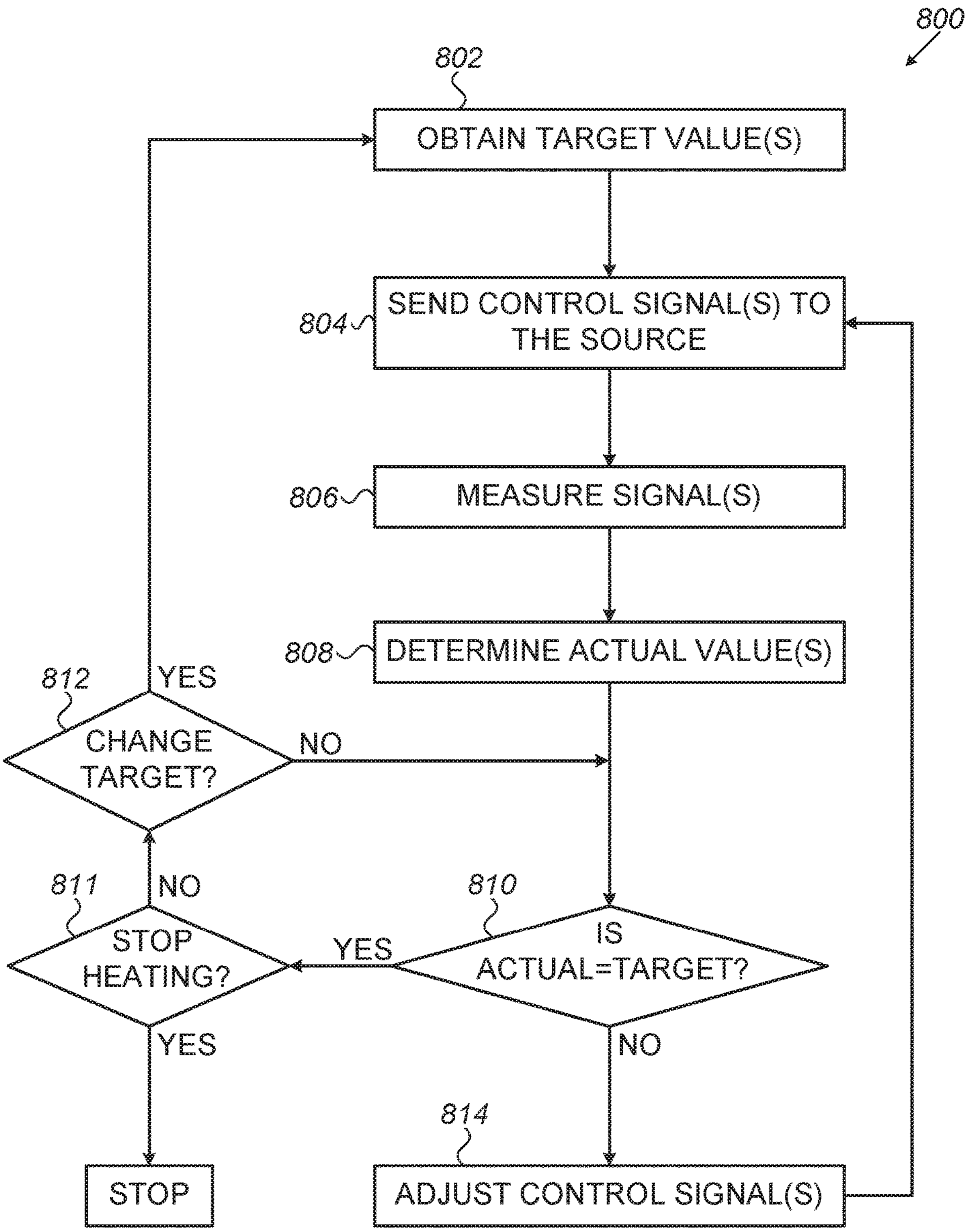
FIG. 8A is a flowchart of a method of heating an object according to some embodiments.

FIG. 8A is a flowchart of a method 800 of heating an object according to some embodiments.

In step 802, a target value is obtained. The target value may be a set of values. For example, the target value may include one or more of an amplitude of each signal (e.g., in a 2-port system, an amplitude of a first signal going to the cavity through a first output channel, and an amplitude of a second signal going to the cavity through the second output channel), a phase (e.g., of each signal), one or more phase differences (e.g., in a four-port system: three phase differences), one or more amplitude ratios, etc. The target may be obtained by processor 112 from a memory accessible to the processor. For example, the memory may include a lookup table with sequences of phase differences, and the processor may be programmed to read a new phase difference once in a given period, e.g., every 1 millisecond, every 10 milliseconds, or shorter, longer or intermediate periods. Each such reading of a phase difference may be an execution of step 802 of obtaining a target.

In some embodiments, processor 112 may obtain the target values by calculation, for example, based on a model that decides target values based on S parameters. One such model may, for example, dictate that energy is applied only at frequency-phase-amplitude combinations associated with certain values of the S parameters. The certain values may be, for example, those for which the sum of all the magnitudes of the S parameters of the cavity is minimal. Other models may also be used. The invention is not limited to any particular way by which the processor obtains the target values.

In step 804, a control signal may be sent from processor 112 to source 108 in order to produce the target. The control signal may result in the source generating signals according to the target or different from the target. If available, control signals that control the source to generate the target are provided, however, in many cases this is impossible, because many uncontrolled parameters may influence the signal generated by the source, as well as influence the signal on its way from the source to the cavity. For example, the signal may be amplified by an amplifier, the amplification gain of which may depend upon the temperature around the amplifier, so when the amplifier's temperature increases (e.g., due to lengthy operation or due to heat arriving from the cavity) the signal outputted from the amplifier may change.

In step 806, portions of the signals transmitted through the output channels in response to the control signal sent to the source in step 804, may be coupled to a measurement device, e.g., to a phase detector and/or to a power meter. The measurement device may measure, for example, the amplitude and phase of each signal going forward to the cavity (e.g., $a_{m1}$ and $a_{m2}$ in FIG. 7).

In step 808, the actual signals entering the cavity may be calculated based on the measured signals. The calculation may further rely on a model for modeling the systematic errors introduced by the measuring device, e.g., the 8-error correction terms model described above. The calculation may further require information on reflections from the cavity. This information may be in the form of measured reflected signals (e.g., $b_{1m}$ and $b_{2m}$ of FIG. 7) and/or S parameters (or other network parameters) of the cavity. In some embodiments, the information on the reflections may be gathered before step 802 is carried out. In some embodiments, the information on the reflections may be gathered during, or as part of, the execution of step 806.

In step 810, the actual values calculated in step 808 may be compared to the target values obtained in step 802. If the target values are similar to the actual values (810 YES), the method may continue by keeping sending the same control signals to the processor as long as a different target is not obtained (812:NO), or the actual values start diverting from their corresponding target values (810:NO). Values may be considered similar if, for example, they differ by less than a threshold difference, or the ratio between them is within a predetermined range around 1.0. In some embodiments, similarity in amplitudes and phases may be estimated independently of each other, so that some values (e.g., amplitudes) may be similar to their target values, while other values (e.g., phases) may be different from their target values. In some embodiments, if even one value is not similar to its target the method continues through 810: NO.

Step 814 includes adjustment of the control parameters sent to the source, and is to be executed if the actual values are different from their corresponding target values (810 NO). In some embodiments, when some actual values are equal to their corresponding values and some are not, all control signals may be adjusted. In some embodiments, some control signals may be kept without adjustment, and some (e.g., those that control parameters that are still different from their corresponding target values) are adjusted. The adjustment may be designed to bring the actual values closer to their corresponding target values.

In case the actual values are sufficiently similar to their corresponding target values (810 YES), it may be checked if a new target value is to be obtained, and if so (812 YES), the method returns to step 802. Otherwise (812 NO), the method may return to step 810, and continue the heating using the same control signals until the actual signals divert from their corresponding values (810:NO) or the heating is to be stopped (811:YES).

The method may be stopped, for example, when a stopping criterion is reached. The stopping criterion may be, for example, a total heating time, a total amount of energy generated by the sources as RF signals, the total amount of energy absorbed by the load, a receipt of a stop signal from a user interface, etc. For example, in some embodiments, there may be a step 811 between steps 810 and 812. Step 811 may include a check if the ending criterion has been met, and if so, the heating may be stopped. Otherwise, the method may continue to step 812 to continue heating using the same control signals or obtaining a new target.

Figure 8B:
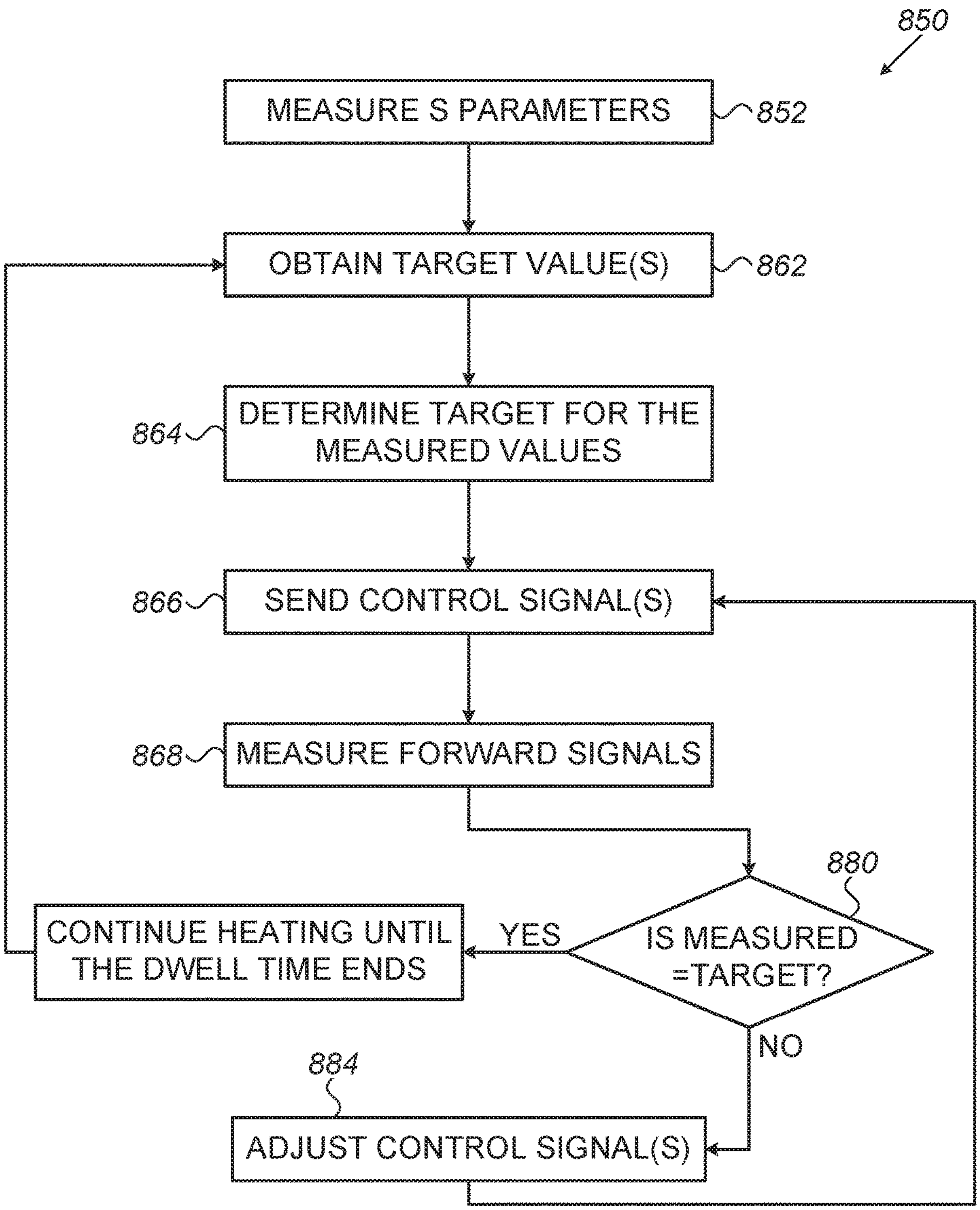
FIG. 8B is a flowchart of a method of heating an object according to some embodiments.

FIG. 8B is a flowchart of a method 850 of heating an object according to some embodiments.

In step 852, S parameters of the cavity with the object therein are measured. This step may include transmitting a signal through each output channel at a time, and measuring the forward and backward signals at each of the ports. This step may further include calculating the S parameters based on these measurements and factory-saved values of error correction terms modeling systematic errors of the measurement system.

In step 862, a target value is obtained, similarly to obtaining the target value in step 802 of method 800. This target value may be referred to herein as actual target, since it is given in terms of the actual signals that are targeted.

In step 864, targets for the measured values are calculated. These may be referred to herein as measured targets. The measured targets may be calculated based on the actual target (obtained in step 862), the S parameters (measured in step 852) the error correction terms (stored by the factory), and the measured forward signals (used for the calculation of the S parameters).

In step 866, a control signal may be sent from processor 112 to source 108 in order to produce the target, similarly to sending the control signal in step 804 of method 800.

In step 868, portions of the signals transmitted through the output channels in response to the control signal sent to the source in step 866, may be coupled to a measurement device, as in step 806 of method 800.

In step 880, the target for the measured values, calculated in step 864 may be compared to the value measured in step 868. If the target values are similar to the measured values (880 YES), the method may continue by sending the same control signals to the processor, for example, for a predetermined dwell time. In some embodiments, the dwell time includes the adjustment time, and measured from the instant the target value is obtained. In some embodiments, the dwell time is measured from the instant the actual value is substantially equal to the target value. In some embodiments, the dwell time is the same each time the method is repeated, for example, with new target values.

Step 884 may include adjustment of the control parameters sent to the source, and is to be executed if the measured values are different from their corresponding target values (880: NO). The adjustment may be designed to bring the actual values closer to their corresponding target values, as discussed above, in relation to method 800 (step 814).

In some embodiments, steps 880 and 884 may be carried out as follows: first, the measured phase is compared to the measured target phase, and if different, the control signals are adjusted (884) and the adjusted control signals are sent to the cavity (866). Forward signals are measured (868), and the measured phase is compared again to the measured target (880). This may be repeated until the measured phase is equal to the measured target phase. In practice, many times, a single adjustment is sufficient. Then, the measured amplitude (or power) may be compared to the target set for it in step 864. If equal, no further adjustment is required. If different, the control signals are adjusted until the measured amplitude is equal to its target. In some embodiments, at this stage the phase may be checked again, and if the adjustments made in order to bring the amplitude to its target value caused the phase to divert. If so, the phase is adjusted again. Usually, no further adjustments are required.

In case the measured values are sufficiently similar to their corresponding target values (880 YES), heating continues using the same control signals until a predetermined dwell time ends (890), and a new target value is obtained (862).

In some embodiments, the method goes back to step 852 (of measuring S parameters) once in a while, for example, after a predetermined time has lapsed from the preceding measurement of S parameter. In some embodiments, thousands of target values may be obtained between two consecutive measurements of S parameters.

As noted above, a method according to some embodiments of the invention may include adjustment of the control parameters sent to the source. The adjustment may be designed to cause the actual values to approach their corresponding target values in one or more steps. For simplicity, a single actual value approaching its corresponding target value is discussed below. In some embodiments, each approaching step brings the actual value closer to the target value. In some embodiments, one or more adjustment steps takes an actual value away from the target value, but all the adjustment steps together bring the actual value closer to the actual value than it was in the beginning of the approaching process.

Figure 9A:
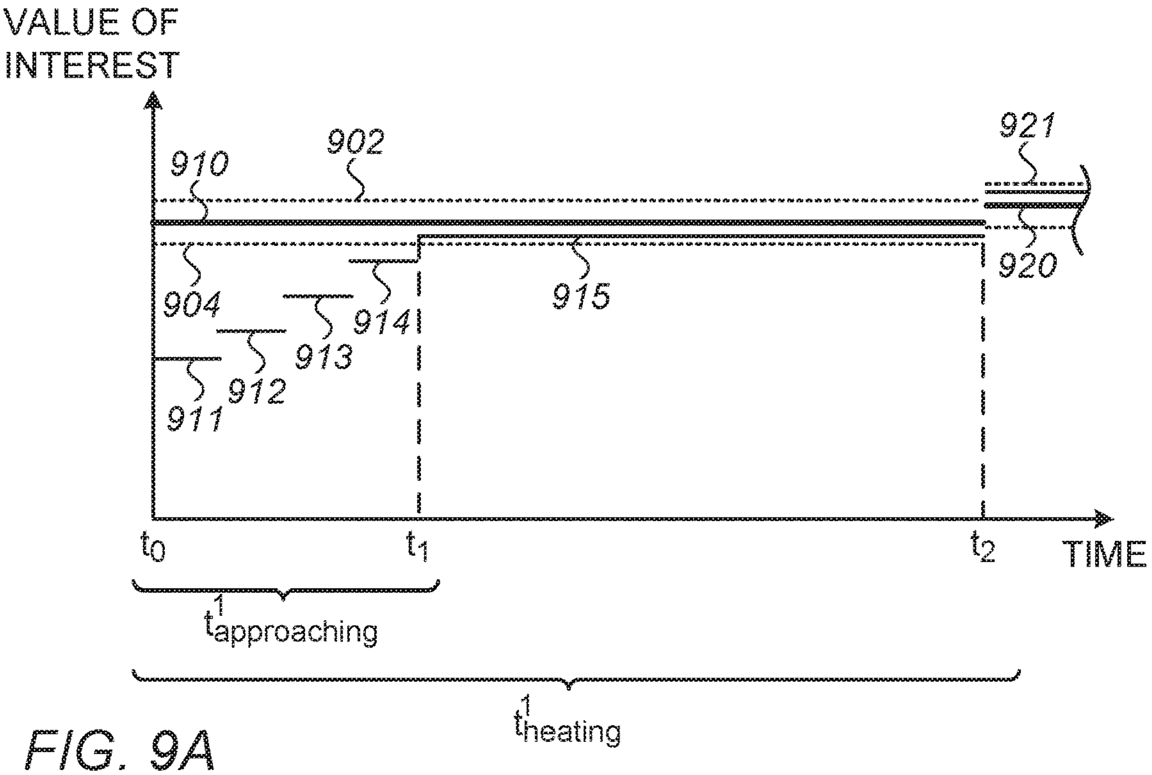
FIG. 9A is a graph that schematically describes how an actual value may approach its corresponding target value according to some embodiments.

FIG. 9A is a graph that schematically describes how an actual value may approach its corresponding target value according to some embodiments. The value may be any value of a signal characteristic, for example, a phase difference value, an amplitude ratio value, an amplitude value, etc. The horizontal axis is a time axis, and the vertical axis is the value of interest axis. The thick line marked as 910 represents a target value. The dashed lines marked 902 and 904 represent thresholds, that if the value of interest is between them, it is considered to be substantially equal to the target value. The thin lines marked as 911, 912, 913, and 914 represent the values as they approach their target. In some embodiments, for example, an embodiment described in FIG. 8A, the value of interest may be an actual value, estimated based on measurements of the phase difference (or other value of interest) and reflection measurements. In some embodiments, for example, an embodiment described in FIG. 8B, the value of interest may be a target set for a measured value. For simplicity, an actual value is used below, although the same may apply to a measured value.

In FIG. 9A each step (e.g., from the value marked as 911 to the value marked as 912) brings the actual value closer to its target, until the value marked as 915 is substantially the same as the target 910. From the moment the actual value is substantially equal to its target (i.e., starting at time $t_1$), the control signals sent to the source remain unchanged until $t_2$, at which a new target value, marked as 920, is set. In the drawing, an actual value 921 which is substantially equal to the new target value 920 is achieved in a first trial, and further adjustment is not required.

The time between the setting of the first target value ($t_0$) and the setting of the second target value ($t_2$) may be referred to herein as a time of heating at the first target value, marked as $t_{heating}^1$. $t_{heating}^1$ may be, in some embodiments, about 1 millisecond long, but in other embodiments may be shorter or longer, e.g., 0.1 milliseconds, 10 milliseconds, 0.1 seconds, 1 second, 10 seconds or any intermediate length. The time between the setting of the first target value ($t_0$) and the time at which the actual value is substantially equal to the first target ($t_1$) may be referred to as an approach time towards the first target value, marked $t_{approaching}^1$. In some embodiments, the ratio between approaching time and heating time, referred to herein as 'approaching ratio time' is smaller than 35% for each target value. In some embodiments, the approaching ratio time for each target value is about 25% or smaller, about 10% or smaller, or about 5% or smaller. In some embodiments, an average approaching ratio time is smaller than 35%, for example, about 25% or smaller, about 10% or smaller, or about 5% or smaller. The average approaching ratio time may be an average over 10, 50, 100, 1000, or any intermediate or larger number of approaching ratio times achieved with successive target values.

The smaller is the approaching ratio time averaged over a heating period, the less time is spent on approaching the target values, and the more accurate is the heating during that period. In this sense, a heating process is absolutely accurate if it is carried out exactly as planned, with no time spent on adjustments.

Figure 9B:
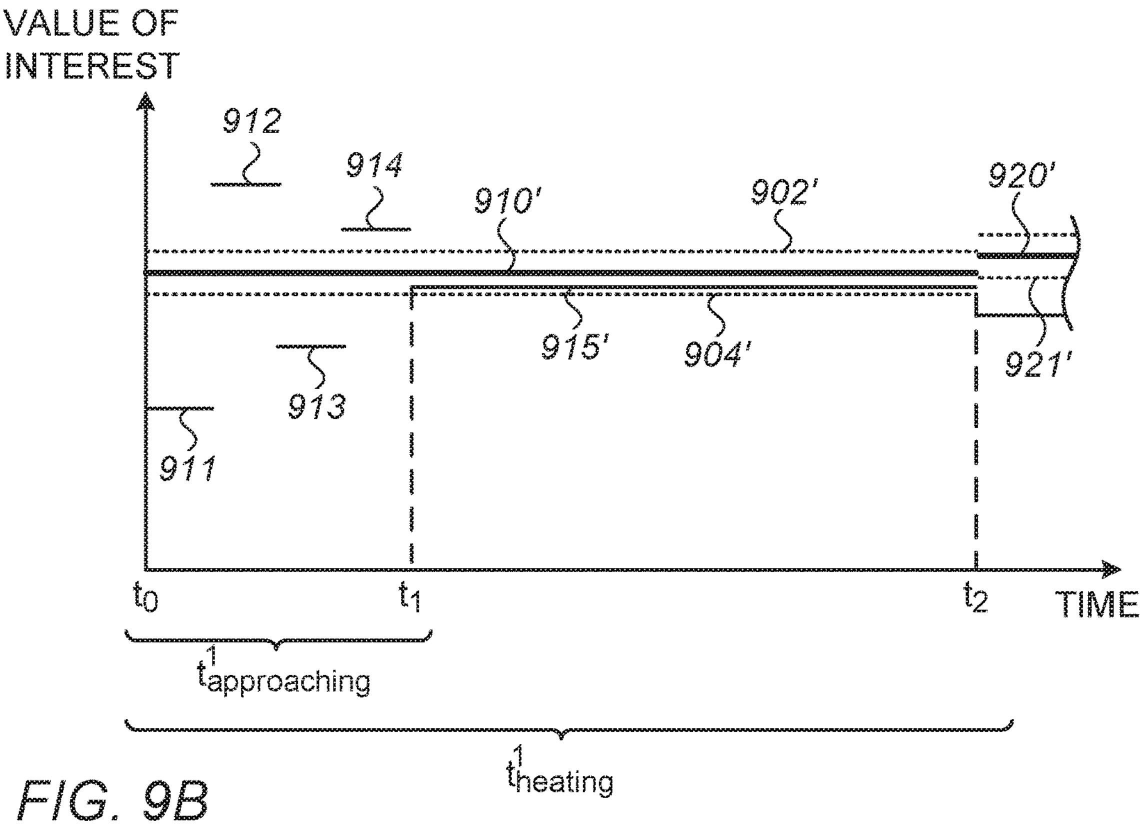
FIG. 9B is a graph that schematically describes how an actual value may approach a target value of interest (e.g., a phase difference value, an amplitude ratio value, or an amplitude value) according to some embodiments.

FIG. 9B is a graph that schematically describes how an actual value may approach a target value of interest (e.g., a phase difference value, an amplitude ratio value, or an amplitude value) according to some embodiments. As in FIG. 9A, the horizontal axis is a time axis, and the vertical axis is the value of interest axis. The thick line marked as 910' represents a target value. The dashed lines marked 902' and 904' are thresholds, that if the actual value is between them, the actual value is considered to be substantially equal to the target value. The thin lines marked as 911, 912, 913, and 914 represent the actual values, estimated based on measurements of the phase difference (or other value of interest) and reflection measurements. In FIG. 9B each step takes the actual value closer to the target value, but at its other side, that is, while the actual value marked as 911 is smaller than the target value, the successive actual value, marked as 912, is larger than the target value. The disclosed technology is not limited to any particular way at which the actual value approaches the target value, e.g., from bottom up, as depicted in FIG. 9A, from top down, or in zigzag as illustrated in FIG. 9B, or in any other manner. In FIG. 9B, an actual value 921' which is not substantially equal to the new target value 920' is achieved in the first trial, and therefore, an approach period (not shown) is required in order to control the signals to have the actual value of interest substantially equal to the second target value.

It is noted that in FIG. 9A and in FIG. 9B the actual values are measured continuously, with no intermission between one actual value and another. In practice, there may be a short pause in the heating, during which the source control changes and the source obeys to the new control signals, e.g., moves from one frequency to another. For example, in some embodiments $t_{heating}^{1}$ is 1 millisecond and the pause is about 1 microsecond. In some embodiments, the pause is longer, e.g., 1% or more of the heating time. However, the longer is the pause, the less efficient is the heating, because no heat is applied to the object during greater portions of the time lapsing between the beginning and ending of the heating.

Summary of Some Inventive Points

In the following, some inventive points and concepts that are apparent from the above description are listed. This listing, however, is not intended to be conclusive.

A first set of inventive points may relate to a method of heating an object. The object may be heated in a cavity by feeding the cavity with RF signals. In the present description and claims "feeding" may be carried out by sending control signals to a source. The method may include:

simultaneously feeding the cavity with at least two RF signals, which may include a first RF signal fed to the cavity via a first antenna and a second RF signal fed to the cavity via a second antenna. The first and second RF signals may have a common frequency, they may differ in phase by a first phase difference.

The method may further include measuring the first phase difference; and adjusting the feeding so that the measured first phase difference approaches a target value. The adjusting may be based on measurements of reflected RF signals reflected from the cavity (e.g., $b_{1m}$ and $b_{2m}$ in FIG. 7).

Alternatively or additionally, adjusting the feeding may be carried out so that the actual phase difference between the signals entering the cavity (e.g., $a_{1a}$ and $a_{2a}$ in FIG. 7) is independent of the reflections from the cavity.

Adjusting the feeding may be based on measurements of a ratio between a first forward RF signal fed to the cavity through a first antenna and a signal reflected from the cavity via the first antenna when the first forward RF signal is fed into the cavity. It is noted that the signals whose reflections are measured (e.g., the first forward RF signal) may be different from the signals used for heating. For example, S parameters may be measured when each antenna sends a forward signal at a time, while heating may be carried out by simultaneously feeding the cavity from a plurality of antennas (e.g., at a target phase difference between them). This may be apparent from FIG. 8B, where reflected signals are used for measuring S parameters (in step 852), while measurements of forward signals (step 868) may suffice during heating.

The reflections may have a different effect on different signals, for example, the effect may be frequency-dependent, phase-dependent, etc. Therefore, reflections may be measured once, but its effect should be calculated for each target signal. As long as the reflections don't change appreciably, there is no need to refresh the reflection measurements. Taking them into consideration, on the other hand, may be advantageous each time a target signal changes. Thus, the measurements of the reflections (e.g., in step 852) may be carried out less frequently than measurements of forward signals (e.g., in step 868). For example, measurements of the first phase difference may be taken more often than measurements of the signals reflected from the cavity.

An interesting effect of using the above-described method (e.g., one of the methods of FIG. 8A or FIG. 8B) is that it may be useful even with relatively simple and cheap couplers. For example, the target values may be approached satisfactorily even when the first phase difference is measured using a coupler having directivity worse than −30 dB.

A similar method may be used when the first and second RF signals should have a target amplitude ratio between them. In such cases, the method may include measuring a first amplitude ratio between the first and second RF signals and adjusting the feeding so that the actual amplitude ratio between them approaches an amplitude ratio target value.

Another set of inventive concepts relates to similar methods, wherein an amplitude of a signal fed to the cavity for heating is adjusted to approach a target value. Such method may be useful even if no coherent heating is used, for example, if only one signal is fed via one antenna at a time, or if only one antenna is available. An example of such method may include feeding the cavity with at least one RF signal; measuring an amplitude of one of the at least one RF signal; and adjusting the feeding based on measurements of reflected signals reflected from the cavity so that the actual amplitude of the signal entering the cavity approaches a target amplitude value.

Other features of the heating method that includes adjusting the phase to reach a target value may also be useful in a method that includes adjusting the amplitude. For example, measurements of the amplitude may be taken more often than measurements of the signals reflected from the cavity, and/or the amplitude of the at least one RF signal is measured using a coupler having directivity worse than −30 dB.

It is also noted that both methods (of controlling phase difference and amplitudes) may be used together, so that both amplitude and phase of each signal are being adjusted to approach target values.

Another set of inventive points may relate to an apparatus for heating an object. The apparatus may heat the object in a cavity. The walls defining the cavity, and the cavity itself may be (or not be) part of the apparatus. The heating may include feeding the cavity with RF signals that differ in phase by a target phase difference. The apparatus may include a source of RF signals, a phase detector, and a processor.

The source of RF signals may be configured to simultaneously supply RF signals of a common frequency to at least two output channels. Two of these output channels will be referred herein as a first output channel and a second output channel.

The phase detector may be configured to measure a first phase difference between an RF signal going through the first output channel towards the cavity and an RF signal going through the second output channel towards the cavity.

The phase detector (or another phase detector) may be configured to measure a reflection phase difference between an RF signal fed to the cavity via one of said at least two output channels and an RF signal returning from the cavity via the same (or other) output channel.

The processor may be configured to control the source based on the measured reflection so that the first phase difference approaches the target phase difference.

The apparatus may also include a power meter. The power meter may be configured to measure an amplitude of an RF signal fed into the cavity through the first output channel. In such apparatuses, the processor may be configured to control the source based on the measured reflection phase difference so that the amplitude measured by the power meter approaches a target amplitude value.

The processor may also be configured to set the target phase difference.

Another set of inventive points may relate to another apparatus for heating an object. The object may be heated by the apparatus in a cavity by feeding the cavity with RF signals of controlled amplitudes. This apparatus may have (or not have) the ability to feed the cavity with RF signals of controlled phase differences. The apparatus may include a source of RF signals, a power meter, a phase detector, and a processor.

The source of RF signals may be configured to supply RF signals to at least one output channel.

The power meter may be configured to measure an amplitude of an RF signal fed into the cavity via the at least one output channel;

The phase detector may be configured to detect reflection phase differences between signals fed into the cavity through one of the at least one output channel and signals reflected from the cavity through the same one or another one of the at least one output channel.

Finally, the processor may be configured to control the source, based on at least one phase difference measured by the phase detector, so that the amplitude measured by the power meter approaches a target amplitude value. For example, the processor may be configured to control the source based on S parameters of the cavity. The S parameters may have complex values (i.e., defined by a magnitude and a phase), and their phase may be calculated based on phase measurements taken by the phase detector.

The apparatus may include in each output channel a coupler having a directivity worse than −30 dB.

It is noted that all the methods and apparatuses described above in relation to phase differences may also be applied in relation to other signal characteristics, for example, amplitudes and/or amplitude ratios.

In the foregoing, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed is:

1. A method of cooking, thawing, or drying food in a cavity by feeding the cavity with RF signals having phase differences of target values, the method comprising:

- setting a target value for a phase difference;
- simultaneously feeding the cavity with at least two RF signals comprising a first RF signal fed to the cavity via a first antenna and a second RF signal fed to the cavity via a second antenna, said first and second RF signals having a common frequency and differ in phase by a first phase difference;
- measuring the first phase difference; and
- adjusting the feeding based on measurements of reflected RF signals reflected from the cavity so that the phase difference between the first and second signals fed to the cavity via the first and second antennas approaches the target value.

2. The method according to claim 1, wherein adjusting the feeding is based on measurements of a ratio between a first forward RF signal fed to the cavity via a first antenna and a signal reflected from the cavity via the first antenna when the first forward RF signal is fed into the cavity.

3. The method of claim 1, wherein the reflected signals are reflected from the cavity when an RF signal is fed into the cavity via one antenna at a time.

4. The method of claim 1, wherein measurements of the first phase difference are taken more often than measurements of the signals reflected from the cavity.

5. The method of claim 1, wherein the first phase difference is measured using a coupler having directivity worse than −30 dB.

6. The method of claim 1, wherein said first and second RF signals differ in amplitude by a first amplitude ratio, and the method comprises measuring the first amplitude ratio and adjusting the feeding so that the actual amplitude ratio between the first and second RF signals approaches an amplitude ratio target value.

7. The method of claim 1, wherein adjusting the feeding is based on:

- measurements of reflected RF signals reflected from the cavity;
- the value of the first phase difference; and
- error correction terms indicative of systematic errors in a measurement system used for measuring the first phase difference.

8. The method of claim 1, wherein said feeding is at power levels and for time durations sufficient to cook, thaw, or dry the food in the cavity.

9. The method of claim 1, further comprising heating the food by energy other than RF energy, and said feeding is at power levels and for time durations sufficient to shorten the cooking, thawing, or drying of the food, in comparison to not applying the RF energy, by at least 15%.

10. The method of claim 1, wherein said setting is based on the food.

11. The method of claim 1, wherein said setting is based on RF absorption in the food.

* * * * *